US012390912B2

(12) United States Patent
Leh et al.

(10) Patent No.: US 12,390,912 B2
(45) **Date of Patent: *Aug. 19, 2025**

(54) IMPACT TOOL WITH CONTROL MODE

(71) Applicant: BLACK & DECKER INC., New Britain, CT (US)

(72) Inventors: Jason K. Leh, Shrewsbury, PA (US); Karim Najjar, Baltimore, MD (US); Scott M. Rudolph, Aberdeen, MD (US); Daniel White, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,278

(22) Filed: Jan. 16, 2024

(65) Prior Publication Data

US 2024/0149410 A1 May 9, 2024

Related U.S. Application Data

(63) Continuation of application No. 16/523,734, filed on Jul. 26, 2019, now Pat. No. 11,904,441, which is a continuation of application No. 14/633,211, filed on Feb. 27, 2015, now Pat. No. 10,406,662.

(51) Int. Cl.
*B25B 23/147* (2006.01)
*B25B 21/02* (2006.01)

(52) U.S. Cl.
CPC .......... *B25B 23/1475* (2013.01); *B25B 21/02* (2013.01)

(58) Field of Classification Search
CPC ............................ B25B 23/1475; B25B 21/02
USPC ..... 173/1–2, 13, 18–20, 184, 29–31, 38–39, 173/45–53, 176
See application file for complete search history.

(56) References Cited

U.S. PATENT DOCUMENTS 7,051,820 B2 * 5/2006 Stirm .................. B25D 16/003 173/109
8,272,452 B2 * 9/2012 Katou .................. B25D 11/005 173/217
2012/0279736 A1 * 11/2012 Tanimoto .............. B25B 21/026 173/117
2013/0062088 A1 * 3/2013 Mashiko ................. B25B 21/02 173/48
2014/0158390 A1 * 6/2014 Mashiko ............... B25B 23/147 173/217
2015/0336249 A1 * 11/2015 Iwata .................... B25B 21/026 173/1
2016/0008961 A1 * 1/2016 Takano ............... B25B 23/1475 173/2

(Continued)

*Primary Examiner* — Robert F Long
(74) *Attorney, Agent, or Firm* — Scott B. Markow

(57) ABSTRACT

An impact tool includes a controller configured to control power being delivered to the and operable in one of: (a) a normal mode where the controller allows power to be delivered to the motor so that the impact mechanism transitions from operation in the rotary mode to operation in the impacting mode when an output torque exceeds a normal transition torque; and (b) a control mode where the controller controls power being delivered to the motor so that the impact mechanism transitions from operation in the rotary mode to operation in the impacting mode when an output torque exceeds a control transition torque that is greater than the normal transition torque.

20 Claims, 17 Drawing Sheets

(56) References Cited

U.S. PATENT DOCUMENTS

| | | | | |
|---|---|---|---|---|
| 2016/0079887 | A1* | 3/2016 | Takano | H02P 1/028<br>318/431 |
| 2016/0129578 | A1* | 5/2016 | Sprenger | B25F 5/001<br>173/1 |
| 2016/0325415 | A1* | 11/2016 | Huber | B25B 23/1475 |
| 2016/0354905 | A1* | 12/2016 | Ely | B25B 21/008 |
| 2019/0344411 | A1* | 11/2019 | Leh | B25B 21/02 |
| 2024/0217077 | A1* | 7/2024 | Chen | B25B 21/02 |

* cited by examiner

IMPACT TOOL WITH CONTROL MODE

RELATED APPLICATIONS

This application claims priority under 35 U.S.C. § 120 as a continuation of U.S. patent application Ser. No. 16/523,734, filed Jul. 26, 2019, titled "Impact Tool with Control Mode," which is a continuation of U.S. patent application Ser. No. 14/633,211, filed Feb. 27, 2015, titled "Impact Tool with Control Mode," each of which is incorporated by reference.

TECHNICAL FIELD

This application relates to an impact tool (such as an impact driver or an impact wrench) operable in a normal mode and a control mode, a controller for such an impact tool, and a method of operating such an impact tool.

BACKGROUND

A power tool known as an impact tool (e.g., an impact driver or an impact wrench) generally includes a motor, a transmission, an impact mechanism, and an output shaft. The impact mechanism generally includes a cam shaft coupled to the transmission, a hammer received over the cam shaft for rotational and axial movement relative to the cam shaft, an anvil coupled to the output shaft, and a spring that biases the hammer toward the spindle. When a low amount of torque is applied to the output shaft, the hammer remains engaged with the anvil and transmits rotational motion from the transmission to the output shaft without any impacts. When a higher amount of torque is applied to the output shaft, the hammer disengages from the anvil and transmits rotary impacts to the anvil and the output shaft. The mechanical characteristics of the impact mechanism components generally determine the output torque at which the impact mechanism transitions from operation in the rotary mode to the impact mode (referred to herein as the normal transition torque).

SUMMARY

When performing certain types of operations, it would be desirable to have the impact mechanism transition from the rotary mode to the impact mode at an output torque that is higher than the normal output torque. For example, when driving certain types of fasteners into certain types of workpieces it can be desirable to have a higher transition torque to avoid inadvertent damage to the fastener or the workpiece. This application discloses an impact tool, a controller for n impact tool, and method for operating such an impact tool.

In an aspect, an impact tool includes a housing, a motor disposed in the housing, an output spindle, and an impact mechanism coupled to the output spindle and configured to be driven by the motor. The impact mechanism is configured to operate in one of a rotary mode in which the impact mechanism transmits rotational motion to the output spindle without rotational impacts and an impacting mode in which the impact mechanism transmits rotational impacts to the output spindle. The impact mechanism is configured to transition from operating in the rotary mode to operating in the impacting mode when a torque on the output spindle exceeds a transition torque. A controller is configured to control power being delivered to the motor and is operable in one of: (a) a normal mode where the controller allows power to be delivered to the motor so that the impact mechanism transitions from operation in the rotary mode to operation in the impacting mode when an output torque exceeds a normal transition torque; and (b) a control mode where the controller controls power being delivered to the motor so that the impact mechanism transitions from operation in the rotary mode to operation in the impacting mode when an output torque exceeds a control transition torque that is greater than the normal transition torque.

Implementations of this aspect may include one or more of the following features. The controller may control power by controlling a parameter or analogue of power. The parameter or analogue of power may include at least one of current, voltage, resistance, duty cycle, motor speed, and torque. In the control mode, the controller may limit the power delivered to the motor to not exceed a first power limit for a first period of time, and then may allow an amount of power delivered to the motor to exceed the first power limit, the first power limit corresponding to a first output torque that is lower than the normal transition torque. In the control mode, the controller may limit the power delivered to the motor to not exceed the first power limit until a first predetermined time period after the controller determines that a tool parameter has reached a first threshold. The tool parameter may include at least one of motor speed, output torque, power delivered to the motor, current delivered to the motor, voltage delivered to the motor, and a duty cycle of a signal applied to the motor. The tool parameter reaching the first threshold may correspond to an output torque reaching a first torque limit, a motor speed decreasing to reach a speed threshold, and/or a current reaching a first current threshold.

In the control mode, the controller may subsequently limit the power delivered to the motor to not exceed a second power limit until a second predetermined time period after the controller determines that the tool parameter has reached a second threshold. The second power limit may correspond to a second output torque that is higher than the first output torque. The second output torque may be greater than the normal transition torque. In the control mode, the controller subsequently may allow the amount of power delivered to the motor to exceed a control transition power that is higher than the normal transition torque and that corresponds to the control transition torque when the impact mechanism will transition to operating in the impact mode.

In the control mode, the controller may: (a) set a plurality of intermediate power limits, each corresponding to a torque that is less than the control transition torque, for a plurality of time periods; and (b) limit the power delivered to the motor not to exceed the power limit when that power limit is set, wherein at least one of the plurality of power limits corresponds to an output torque that is lower than the normal transition torque. The plurality of intermediate power limits may sequentially increase. At least one of a plurality of intermediate power limits may be less than a preceding one of the plurality of intermediate power limits.

In the control mode, after the impact mechanism transitions to operating in the impact mode, the controller may set an impacting power limit that is lower than the power at which the impact mechanism transitions to operating in the impact mode. The controller may set an impacting power limit by limiting at least one of power, current, voltage, duty cycle, motor speed, and torque.

In another aspect, an impact tool may include a housing, a motor disposed in the housing, an output spindle, and an impact mechanism coupled to the output spindle and configured to be driven by the motor. The impact mechanism is configured to operate in one of a rotary mode in which the impact mechanism transmits rotational motion to the output spindle without impacts and an impacting mode in which the impact mechanism transmits rotational impacts to the output spindle. Absent any limit on power delivered to the motor, the impact mechanism is configured to transition from operating in the rotary mode to operating in the impacting mode when a torque on the output spindle exceeds a first transition torque. A controller is configured to control power being delivered to the motor so that the impact mechanism transitions from operating in the rotary mode to operating in the impacting mode when a torque on the output spindle exceeds a second transition torque that is higher than the first transition torque by: (a) setting a plurality of intermediate power limits, each corresponding to a torque that is less than the control transition torque, for a plurality of time periods; and (b) limiting power delivered to the motor not to exceed the power limit when that power limit is set, wherein at least one of the plurality of power limits corresponds to an output torque that is lower than the first transition torque.

Implementations of this aspect may include one or more of the following features. At each power limit, the controller may be configured to limit power delivered to the motor not to exceed the power limit until a predetermined time period after the controller determines that a tool parameter has been reached. The tool parameter may comprise at least one of motor speed, output torque, power delivered to the motor, current delivered to the motor, voltage delivered to the motor, and a duty cycle of a signal applied to the motor. The predetermined time period for the final power limit may be longer than the predetermined time periods for all previous power limits. After the predetermined time corresponding to a highest of the plurality of intermediate power limits has expired, the controller may be configured to allow an amount of power delivered to the motor to exceed a transition power that corresponds to the second transition torque. At least the highest intermediate power limit corresponds to an output torque that is greater than the first transition torque. Each power limit may include at least one of a current limit, a voltage limit, a duty cycle limit, and a motor speed limit, and the controller controls the amount of power by controlling at least one of the current delivered to the motor, the voltage delivered to the motor, the duty cycle of a signal that controls the motor, and the motor speed.

In another aspect, an impact tool includes a housing, a motor disposed in the housing, an output spindle, and an impact mechanism coupled to the output spindle and configured to be driven by the motor. The impact mechanism has an input shaft, a hammer received over the input shaft, an anvil coupled to the output spindle, and a spring biasing the hammer toward the anvil. The impact mechanism is operable in one of a rotary mode in which the impact mechanism transmits rotational motion to the output spindle without impacts and an impacting mode in which the impact mechanism transmits rotational impacts to the output spindle. Absent any limit on power delivered to the motor, the impact mechanism is configured to transition from operating in the rotary mode to operating in the impacting mode when a torque on the output spindle exceeds a first transition torque. A controller is configured to control an amount of current being delivered to the motor so that the impact mechanism transitions from operating in the rotary mode to operating in the impacting mode when a torque on the output spindle exceeds a second transition torque that is higher than the first transition torque by limiting an amount of current delivered to the motor to not exceed a plurality of intermediate current limits. Each current limit corresponds to a torque that is less than the second transition torque and each current limit is maintained until a predetermined time period after the controller determines that a motor speed has decreased to a threshold value.

In another aspect, a hybrid impact tool includes a housing, a motor disposed in the housing, an output spindle, and an impact mechanism coupled to the output spindle and configured to be driven by the motor. The impact mechanism is configured to operate in one of a rotary configuration in which the impact mechanism transmits rotational motion to the output spindle without rotational impacts, and an impacting configuration in which the impact mechanism transmits rotational impacts to the output spindle. The impact mechanism is configured to transition from the rotary configuration to the impacting configuration when an output torque exceeds a first threshold value. A controller is configured to control operation of the impact mechanism and an amount of power being delivered to the motor. The controller is operable in one of: (a) an impact mode in which the controller allows the impact mechanism to transition from the rotary configuration to the impact configuration when the output torque exceeds the first threshold value, (2) a drill mode in which the controller prevents the impact mechanism from transitioning from the rotary configuration to the impacting configuration even if the output torque exceeds the first threshold value, and (3) a control mode in which the controller prevents the impact mechanism from transitioning to from the rotary configuration to the impact configuration until the output torque exceeds a second threshold value that is greater than the first threshold value.

In another aspect, a method of operating a power tool having an impact mechanism coupled to an output spindle and configured to be driven by a motor, the impact mechanism configured to operate in one of a rotary mode in which the impact mechanism transmits rotational motion to the output spindle without rotational impacts and an impacting mode in which the rotary impact mechanism transmits rotational impacts to the output spindle is disclosed. The method includes receiving a user selection of operation in one of a normal mode or a control mode. In the normal mode, the method includes delivering power to the motor so that the rotary impact mechanism transitions from operation in the rotary mode to operation in the impacting mode when an output torque exceeds a normal transition torque. In the control mode, the method includes controlling, via a controller, power delivered to the motor so that the rotary impact mechanism transitions from operation in the rotary mode to operation in the impacting mode when an output torque exceeds a control transition torque that is greater than the normal transition torque.

Implementations of this aspect may include one or more of the following features. Controlling power may comprise controlling a parameter or analogue of power. The parameter or analogue of power may comprise at least one of current, voltage, resistance, duty cycle, motor speed, and torque. Controlling power may comprise limiting power delivered to the motor to not exceed a first power limit for a first period of time, and then allowing an amount of power delivered to the motor to exceed the first power limit, the first power limit corresponding to a first output torque that is lower than the normal transition torque. Controlling power may comprise limiting the power delivered to the motor to not exceed the first power limit until a first predetermined time period after the controller determines that a tool parameter has reached a first threshold. The tool parameter may comprise at least one of motor speed, output torque, power delivered to the motor, current delivered to the motor, voltage delivered to the motor, and a duty cycle of a signal applied to the motor.

The tool parameter reaching the first threshold may correspond to an output torque reaching a first torque limit, a motor speed decreasing to reach a speed threshold, or a current reaching a first current threshold.

Controlling power may further comprise subsequently limiting the power delivered to the motor to not exceed a second power limit until a second predetermined time period after the controller determines that the tool parameter has reached a second threshold. The second power limit may correspond to a second output torque that is higher than the first output torque. The second output torque may be greater than the normal transition torque.

Controlling power may further comprise subsequently allowing the amount of power delivered to the motor to exceed a control transition power that is higher than the normal transition torque and that corresponds to the control transition torque when the impact mechanism will transition to operating in the impact mode. Controlling power may comprise: (a) setting a plurality of intermediate power limits, each corresponding to a torque that is less than the control transition torque, for a plurality of time periods; and (b) limitng the power delivered to the motor not to exceed the power limit when that power limit is set, wherein at least one of the plurality of power limits corresponds to an output torque that is lower than the normal transition torque. The plurality of intermediate power limits sequentially increase. At least one of a plurality of intermediate power limits may be less than a preceding one of the plurality of intermediate power limits.

In the control mode, after the impact mechanism transitions to operating in the impact mode, the method may include setting an impacting power limit that is lower than the power at which the impact mechanism transitions to operating in the impact mode. Setting an impacting power limit may comprise limiting at least one of power, current, voltage, duty cycle, motor speed, and torque.

In another aspect, a method of operating a power tool having an impact mechanism coupled to an output spindle and configured to be driven by a motor, the impact mechanism configured to operate in one of a rotary mode in which the impact mechanism transmits rotational motion to the output spindle without rotational impacts and an impacting mode in which the rotary impact mechanism transmits rotational impacts to the output spindle, the impact mechanism configured to transition from operating in the rotary mode to operating in the impacting mode when a torque on the output spindle exceeds a first transition torque, is disclosed. The method includes controlling, via a controller, power delivered to the motor so that the impact mechanism transitions from operating in the rotary mode to operating in the impacting mode when a torque on the output spindle exceeds a second transition torque that is higher than the first transition torque by: (a) setting a plurality of intermediate power limits, each corresponding to a torque that is less than the control transition torque, for a plurality of time periods; and (b) limiting power delivered to the motor not to exceed the power limit when that power limit is set, wherein at least one of the plurality of power limits corresponds to an output torque that is lower than the first transition torque.

Implementations of this aspect may include one or more of the following features. At each power limit, limiting power may comprise limiting power delivered to the motor not to exceed the power limit until a predetermined time period after the controller determines that a tool parameter has been reached. The tool parameter may comprise at least one of motor speed, output torque, power delivered to the motor, current delivered to the motor, voltage delivered to the motor, and a duty cycle of a signal applied to the motor. The predetermined time period for the final power limit may be longer than the predetermined time periods for all previous power limits.

After the predetermined time corresponding to a highest of the plurality of intermediate power limits has expired, the method may include allowing an amount of power delivered to the motor to exceed a transition power that corresponds to the second transition torque. At least the highest intermediate power limit may correspond to an output torque that is greater than the first transition torque. Each power limit may include at least one of a current limit, a voltage limit, a duty cycle limit, and a motor speed limit, and the controller controls the amount of power by controlling at least one of the current delivered to the motor, the voltage delivered to the motor, the duty cycle of a signal that controls the motor, and the motor speed.

In another aspect, a method of operating a power tool having an impact mechanism coupled to an output spindle and configured to be driven by a motor, the impact mechanism configured to operate in one of a rotary mode in which the impact mechanism transmits rotational motion to the output spindle without rotational impacts and an impacting mode in which the rotary impact mechanism transmits rotational impacts to the output spindle, the impact mechanism is configured to transition from operating in the rotary mode to operating in the impacting mode when a torque on the output spindle exceeds a first transition torque, is disclosed. The method includes controlling, via a controller, an amount of current being delivered to the motor so that the rotary impact mechanism transitions from operating in the rotary mode to operating in the impacting mode when a torque on the output spindle exceeds a second transition torque that is higher than the first transition torque by limiting an amount of current delivered to the motor to not exceed a plurality of intermediate current limits, wherein each current limit corresponds to a torque that is less than the second transition torque and each current limit is maintained until a predetermined time period after the controller determines that a motor speed has decreased to a threshold value.

In another aspect, a method of operating a hybrid impact tool having an impact mechanism coupled to an output spindle and configured to be driven by a motor, the impact mechanism configured to operate in one of a rotary configuration in which the impact mechanism transmits rotational motion to the output spindle without rotational impacts, and an impacting configuration in which the rotary impact mechanism transmits rotational impacts to the output spindle, the impact mechanism configured to transition from the rotary configuration to the impacting configuration when an output torque exceeds a first threshold value, is disclosed. The method includes controlling, via a controller, operation of the impact mechanism and an amount of power being delivered to the motor in one of: (a) an impact mode in which the controller allows the impact mechanism to transition from the rotary configuration to the impact configuration when the output torque exceeds the first threshold value, (2) a drill mode in which the controller prevents the impact mechanism from transitioning from the rotary configuration to the impacting configuration even if the output torque exceeds the first threshold value, and (3) a control mode in which the controller prevents the impact mechanism from transitioning to from the rotary configuration to the impact configuration until the output torque exceeds a second threshold value that is greater than the first threshold value.

Advantages may include one or more of the following. In the control mode, the impact tool will transition from operation in the rotary mode to operation in the impact mode at a higher transition torque than in a normal mode of operation. This can help avoid damage to a workpiece or a fastener being driven by the impact tool, and provides the user with greater control when using an impact tool. These and other advantages and features will be apparent from the description, the drawings, and the claims.

DETAILED DESCRIPTION

Figure 1:
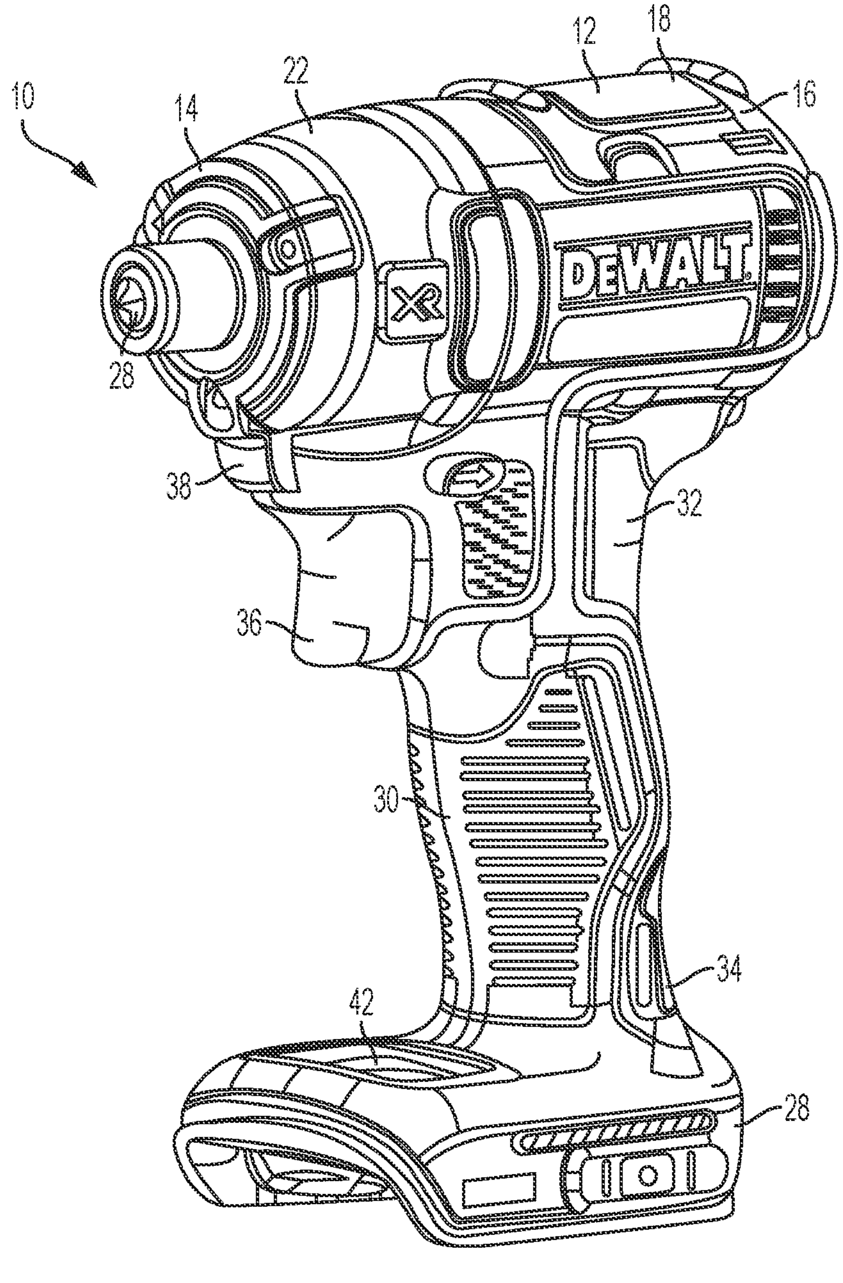
FIG. 1 is a perspective view of an embodiment of an impact tool.
Figure 2:
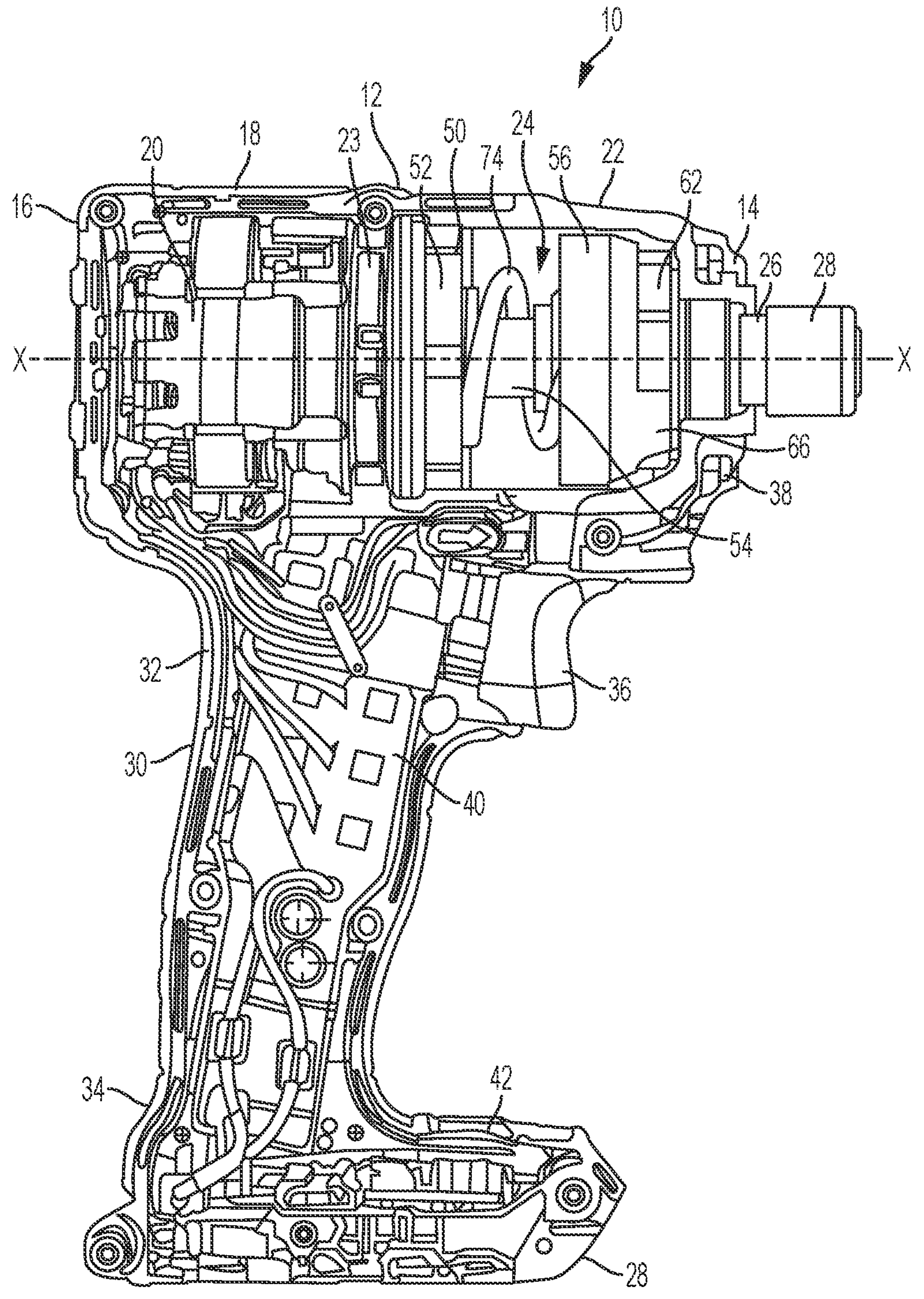
FIG. 2 is a side view of the impact tool of FIG. 1 with a portion of the housing removed.

Referring to FIGS. 1 and 2, in an embodiment, an impact tool 10 has a housing 12 having a front end portion 14 and a rear end portion 16. The housing 12 includes a motor housing portion 18 that contains a rotary motor 20 and a transmission housing portion 22 that contains a transmission 23 and an impact mechanism 24. The transmission 23 and impact mechanism 24 transmit rotary motion from the motor 20 to an output spindle 26, as described in greater detail below. Coupled to the output spindle 26 is a tool holder 28 for retaining a tool bit (e.g., a drill bit or screw driving bit, not shown). The output spindle 26 and the tool holder 28 together define and extend along a tool axis X-X. As shown, the tool holder 28 includes a hex bit retention mechanism. Further details regarding exemplary tool holders are set forth in commonly-owned U.S. patent application Ser. No. 12/394,426, which is incorporated herein by reference.

Extending downward and slightly rearward of the housing 12 is a handle 30 in a pistol grip formation. The handle 30 has a proximal portion 32 coupled to the housing 12 and a distal portion 34 coupled to a battery receptacle 28. The motor 20 may be powered by an electrical power source, such as a DC power source or battery (not shown), that is coupled to the battery receptacle 28, or by an AC power source. A trigger 36 is coupled to the handle 20 adjacent the housing 12. The trigger 36 connects the electrical power source to the motor 20 via a controller 40 that controls power delivery to the motor 20, as described in greater detail below. A light unit (e.g., an LED) 38 may be disposed on the front end portion 14 of the housing 12, just below the tool holder 28 to illuminate an area in front of the tool holder 28. Power delivery to the light unit 38 may be controlled by the trigger 36 and the controller 40, or by a separate switch on the tool.

Coupled to the battery receptacle 28 is a mode change switch 42, which provides an input to the controller 40. The mode change switch 42 allows the user to select between a normal mode of operation and a delayed impact or control mode of operation, as described in greater detail below. The mode change switch 42 may also function as a speed selector switch for causing the motor to run at different maximum motor speeds (e.g., by a feedback control loop). For example, in one possible embodiment the mode change switch 42 may have three positions—a low speed with the control mode, a medium speed with the normal mode, and a high speed with the normal mode. Various other combinations of modes and speeds are possible. In addition, there may be separate switches for controlling the mode (normal vs. control) and the maximum output speed. Based on the selected mode and/or speed, the controller controls the power delivered to the motor by controlling power or by controlling one or more parameters or analogues of power, such as current, voltage, resistance, duty cycle of a PWM signal, motor speed, and/or torque. The term power is used in this application in a generic manner to refer to power or to any of these or other parameters or analogues of power.

Figure 3:
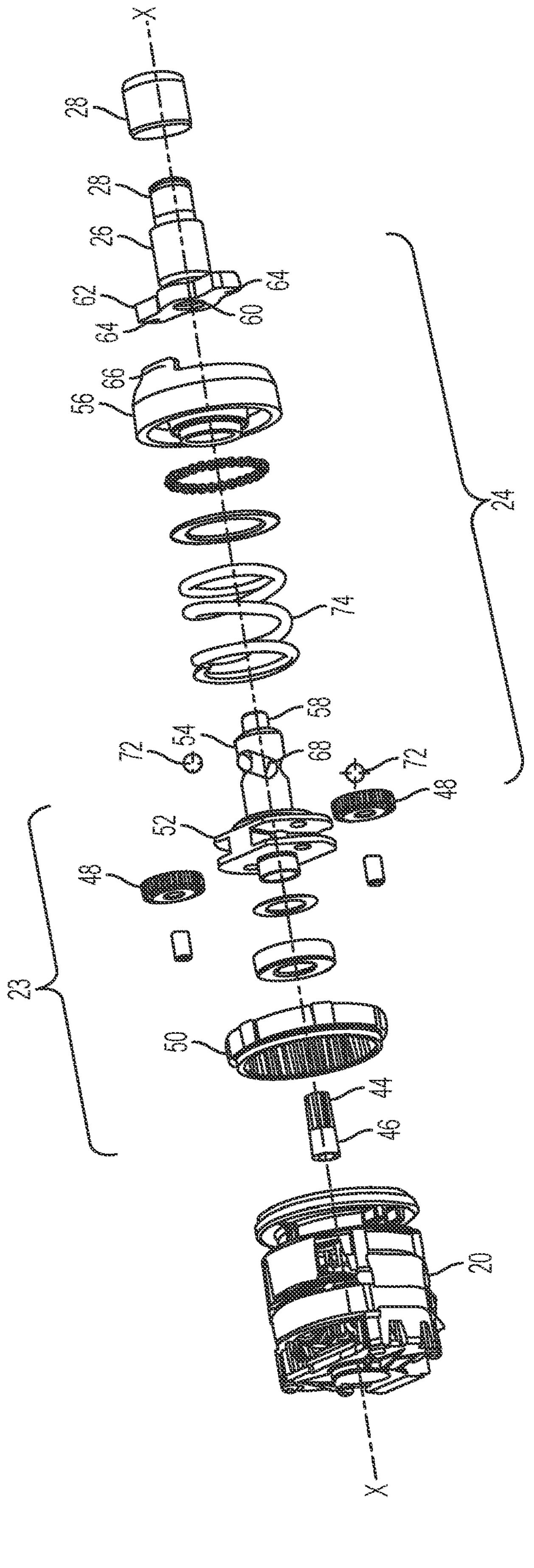
FIG. 3 is an exploded view of the motor, transmission, and impact mechanism of the impact tool of FIG. 1.

Referring also to FIG. 3, the transmission 23 is a planetary transmission that includes a pinion or sun gear 44 that is coupled to an output shaft 46 of the motor 20 and that extends along the tool axis X-X. One or more planet gears 48 surround and have teeth that mesh with the teeth on the sun gear 44. An outer ring gear 50 is rotationally fixed to the housing 12 and centered on the tool axis X-X with its internal teeth meshing with the teeth on the planet gears 48. The planet gears 48 are pivotally coupled to a planet carrier 52. When the motor 20 is energized, it causes the motor output shaft 46 and the sun gear 44 to rotate about the tool axis X-X. Rotation of the sun gear 44 causes the planet gears 48 to orbit the sun gear 44 about the motor axis X-X, which in turn causes the planet carrier 52 to rotate about the motor axis X-X at a reduced speed relative to the rotational speed of the motor output shaft 46. In the illustrated embodiment, only a single planetary stage is shown. It should be understood that the transmission may include multiple planetary stages that may provide for multiple speed reductions, and that each stage can be selectively actuated to provide for multiple different output speeds of the planet carrier. Further, the transmission may include a different type of gear system such as a parallel axis transmission or a spur gear transmission.

The impact mechanism 24 includes a cam shaft 54 extending along the tool axis X-X and fixedly coupled to the planet carrier 52 so that they rotate together. Received over the cam shaft 54 is a cylindrical hammer 56 that is configured to move rotationally and axially relative to the cam shaft 54. The cam shaft 54 also has a front end 58 of smaller diameter that is rotatably received in an axial opening 60 in the output spindle 26. Fixedly coupled to a rear end of the output spindle 26 is an anvil 62 having two radial projections 64. The hammer 56 has two hammer projections 66 on its front end that lie in the same rotational plane as the radial projections 64 of the anvil 62 so that each hammer projection 66 may engage a corresponding anvil projection 64 in a rotating direction.

Formed on an outer wall of the cam shaft 54 is a pair of rear-facing V-shaped cam grooves 68 with their open ends facing toward the rear end portion 16 of the housing 12. A corresponding pair of forward-facing V-shaped cam grooves (not shown) is formed on an interior wall of the hammer 56 with their open ends facing toward the front end portion 14 of the housing 12. A ball 72 is received in and rides along each of the cam grooves 68, 70 to couple the hammer 56 to the cam shaft 54. A compression spring 74 is received in a cylindrical recess 76 in the hammer 56 and abuts a forward face of the planet carrier 52. The spring 74 biases the hammer 56 toward the anvil 62 so that the so hammer projections 66 engage the corresponding anvil projections 64.

At low torque levels, the impact mechanism 24 transmits torque to the output spindle 28 in a rotary mode. In the rotary mode, the compression spring 74 maintains the hammer 56 in its most forward position so that the hammer projections 66 engage the anvil projections 64. This causes the cam shaft 54, the hammer 56, the anvil 62 and the output spindle to rotate together as a unit about the tool axis X-X so that the output spindle 26 has substantially the same rotational speed as the cam shaft 54.

As the torque increases to exceed a torque transition threshold, the impact mechanism 24 transmits torque to the output spindle 28 in an impact mode. In the impact mode, the hammer 56 moves axially rearwardly against the force of the spring 74. This decouples the hammer projections 66 from the anvil projections 64. Thus, the anvil 62 continues to spin freely on its axis without being driven by the motor 20 and transmission 23, so that it coasts to a slightly slower speed. Meanwhile, the hammer 56 continues to be driven at a higher speed by the motor 20 and transmission 23. As this occurs, the hammer 56 moves axially rearwardly relative to the anvil 62 by the movement of the balls 72 rearwardly in the V-shaped cam grooves 68. When the balls 72 reach their rearmost position in the V-shaped cam grooves 68, 70 the spring 74 drives the hammer 56 axially forward with a rotational speed that exceeds the rotational speed of the anvil 62. This causes the hammer projections 66 to rotationally strike the anvil projections 64, imparting a rotational impact to the output spindle 26. This impacting operation repeats as long as the torque on the output spindle 26 continues to exceed the torque transition threshold.

The normal transition torque threshold $T_{N\text{-}TRANS}$ for when the impact mechanism 24 transitions from the rotary mode to the impact mode is a function of the mechanical characteristics of the components of the impact mechanism 24, such as the inertia of the hammer 56 and the force of the spring 74 (although the normal torque transition threshold may vary slightly based on external factors such as motor speed or acceleration, characteristics of the workpiece and/or fastener, and/or loading of the output spindle). The normal transition torque threshold generally corresponds to an amount of power being delivered to the motor, i.e., a normal transition power $P_{N\text{-}TRANS}$.

Figure 4:
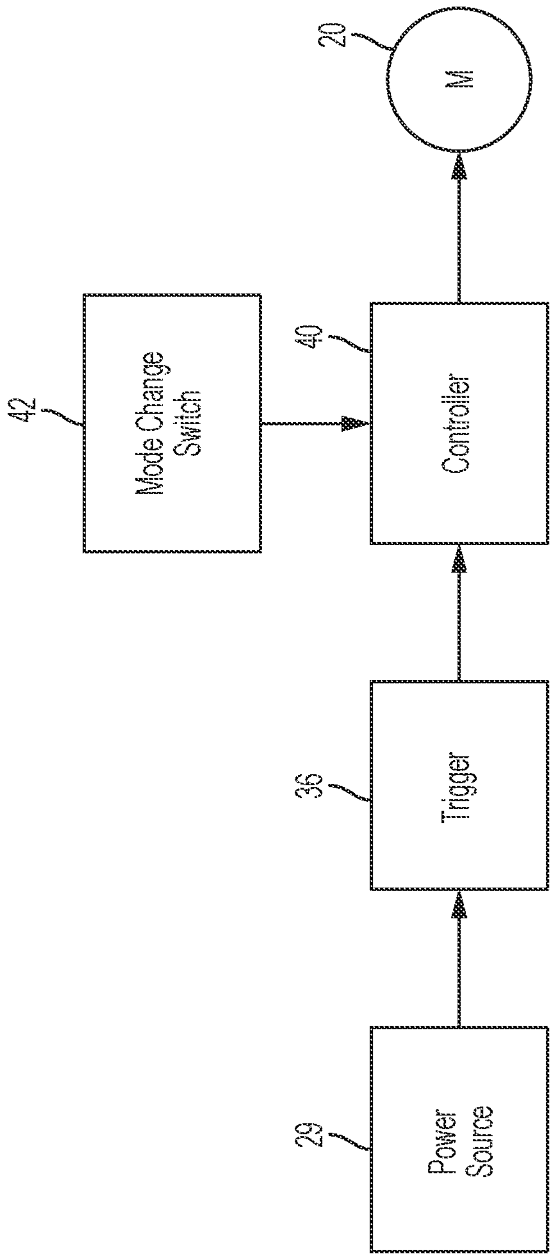
FIG. 4 is a schematic view of a controller configured to implement a first embodiment of a control mode.

Referring FIG. 4, in a first embodiment of a control mode, the trigger 36 connects the electrical power source 29 to the motor 20 via the controller 40 that controls power delivery to the motor 20. The controller 40 may include a microprocessor or other control circuit, a memory device (such as a ROM, RAM, or flash memory device) coupled to the controller 40, and a motor driving circuit (such as an H-bridge circuit, a half-bridge circuit, or an inverter circuit). Based on the amount of trigger 36 displacement, the controller 40 controls the amount of power to be delivered to the motor 20, e.g., to achieve a certain motor speed or output torque. This control can be performed, e.g., by open-loop or closed-loop feedback control, or by driving the motor, e.g., with pulse-width-modulation (PWM).

In the normal mode, the controller 40 controls power delivered to the motor so that the impact mechanism transitions from operation in the rotary mode to operation in the impacting mode when the output torque on the output spindle 26 exceeds the normal transition torque $T_{N\text{-}TRANS}$. In the control mode, the controller 40 controls power delivered to the motor so that the impact mechanism transitions from operation in the rotary mode to operation in the impacting mode when an output torque on the output spindle exceeds a control transition torque $T_{C\text{-}TRANS}$ that is greater than the normal transition torque $T_{N\text{-}TRANS}$. In other words, in the control mode, transition to impacting mode is delayed until a higher output torque $T_{C\text{-}TRANS}$ is reached, allowing the user to drive fasteners at a higher torque without transitioning to the impacting mode of the impact mechanism. This gives the user greater control over tool operation. Various embodiments of operation of the impact tool 10 in the normal and in the control mode are described in greater detail below.

Figure 5:
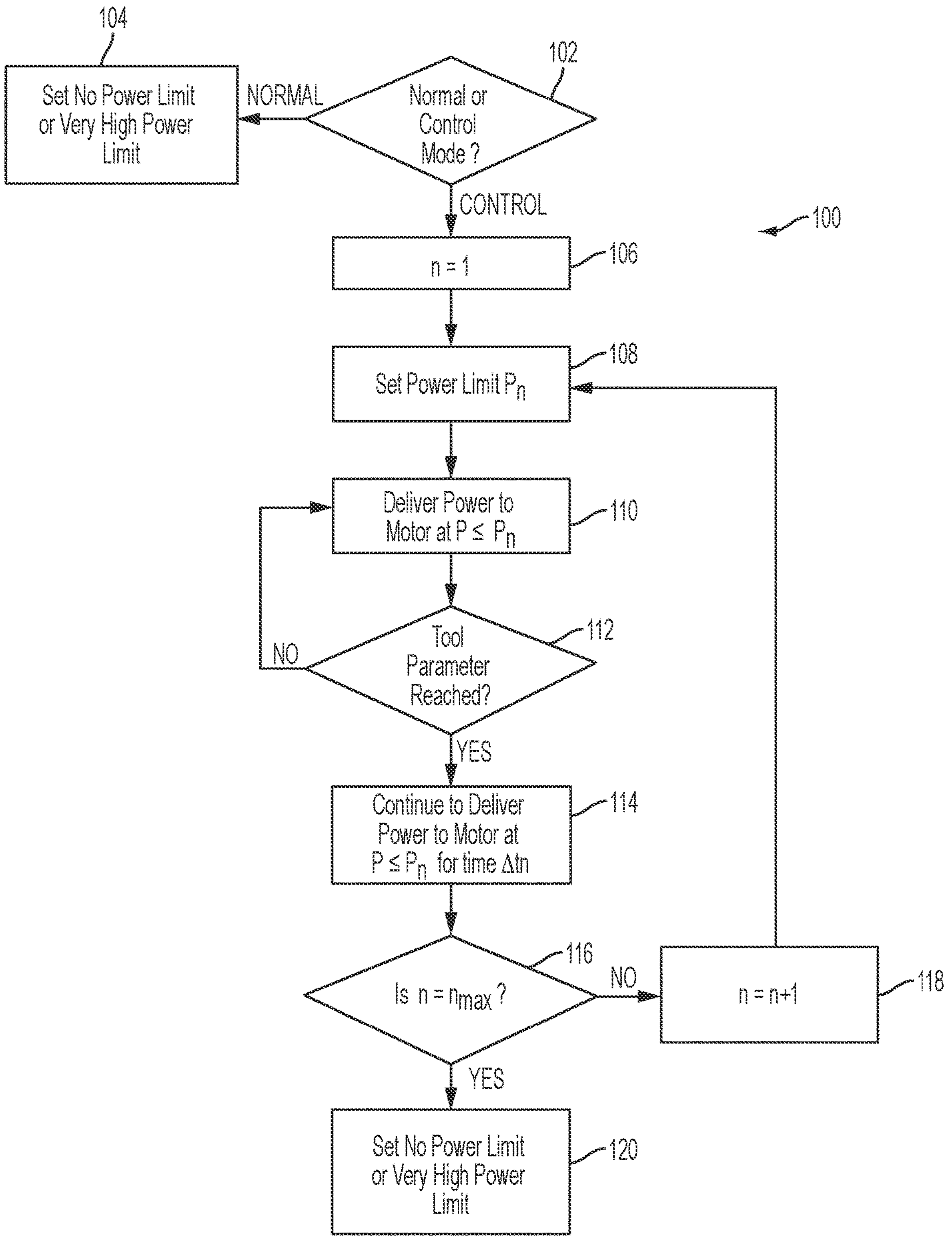
FIG. 5 is a flow chart illustrating operation of the first embodiment of the control mode.

Referring to FIG. 5, in the first embodiment of the control mode, the controller 40 is programmed or configured to implement a process 100 for operation of the impact tool 10 in the normal mode and the control mode. At step 102, the controller receives an input from the mode change switch 42 as to whether the user has selected the normal mode or the control mode. If the user has selected the normal mode, then at step 104, the controller 40 sets no limit or a very high limit on the amount of power that can be delivered to the motor (i.e., the power limit is set much higher than a normal transition power $P_{N\text{-}TRANS}$ that corresponds to the normal transition torque $T_{N\text{-}TRANS}$). When the amount of torque T on the output shaft exceeds the normal transition torque $T_{N\text{-}TRANS}$, the impact mechanism transitions from operating in rotary mode to operating in the impact mode. This generally corresponds to the amount of power P being delivered to the motor exceeding the normal transition power $P_{N\text{-}TRANS}$.

If, at step 102, the controller 40 determines that the user has selected the control mode, then the controller controls power P delivered to the motor to establish a control transition torque $T_{C\text{-}TRANS}$ that is higher than the normal transition torque $T_{N\text{-}TRANS}$. The control transition torque $T_{C\text{-}TRANS}$ corresponds to a control transition power $P_{C\text{-}TRANS}$ that is higher than the normal transition power $P_{N\text{-}TRANS}$. The higher control transition torque $T_{C\text{-}TRANS}$ can be achieved by initially setting a first power limit $P_1$ for the motor and then changing the power limit in a plurality of steps $P_n$ until reaching a final maximum power limit $P_{max}$ that is somewhat less than or equal to the control transition power $P_{C\text{-}TRANS}$. The controller 40 changes a given power limit $P_n$ to the next power limit in the sequence $P_{n+1}$ a predetermined time after the controller 40 determines that a tool parameter for that power limit $P_n$ has been reached. In other words, when the tool parameter has been reached, the controller 40 maintains the present power limit $P_n$ for a predetermined additional time period Δtn. This allows inertia to be dissipated from the impact mechanism, preventing the impact mechanism from transitioning to the impact mode until the higher control transition torque $T_{C\text{-}TRANS}$ and a higher control transition power $P_{C\text{-}TRANS}$ have been reached. After the maximum power limit $P_{max}$ of the plurality of power limits has been set and the predetermined condition for the maximum power limit $P_{max}$ has been reached, the controller 40 sets no power limit or a very high power limit to allow the amount of power delivered to the motor to exceed a control transition power $P_{C\text{-}TRANS}$ so that the impact mechanism transitions from the rotary mode to the impact mode.

More specifically, at step 106, the controller 40 initializes a step counter n to the first step (n=1). At step 108, the controller 40 sets a first power limit $P_1$ that corresponds to a first torque limit $T_1$, each of which are substantially less than the normal transition power $P_{N\text{-}TRANS}$ and the normal transition torque $T_{N\text{-}TRANS}$. The first power limit $P_1$ prevents the motor from delivering enough torque to the impact mechanism to allow the impact mechanism to transition from the rotary mode to the impact mode. At step 110, the controller 40 then delivers power to the motor at a power P that does not exceed the first power limit $P_1$.

At step 112, the controller 40 determines whether a first tool parameter has been reached. For example, the controller 40 may determine whether the motor speed, the power, the output torque, the current, the voltage, or the duty cycle has increased or decreased to reach, exceed or become less than a threshold value. If the first tool parameter has not been reached, then at step 110, the controller 112 returns to step 110 and continues to deliver power to the motor at a power P that does not exceed the first power limit $P_1$. Once the controller 40 determines, at step 112, that the first tool parameter has been reached, then at step 114, the controller 40 maintains the first power limit $P_1$ for a predetermined additional time interval Δt1. Maintaining the first power limit $P_1$ during this additional time interval Δt1 allows inertia to be dissipated from the impact mechanism, which delays the build-up of inertia that would otherwise cause the impact mechanism to transition to the impact mode of operation.

After expiration of the additional time Δt1, at step 116, the controller 40 determines whether the counter n has reached its maximum value (in this case n=5). If not, then at step 118, the controller 40 increments the counter n by n+1, and loops back to step 108 to set the next power limit in the sequence (e.g., a second power limit $P_2$) that corresponds to the next torque limit in the sequence (e.g., a second torque limit $T_2$). The above-described process repeats until, at step 116, the controller 40 determines that the counter n has reached its maximum value (e.g., n=5), meaning that the controller 40 has already set the maximum power limit $P_{max}$ (e.g., a fifth power limit $P_5$) that corresponds to a maximum torque limit $T_{max}$ (e.g., a fifth torque limit $T_5$). When, at step 116, the controller determines that the counter n has reached its maximum value, then at step 120, the controller 40 sets no limit or a very high limit on the amount of power that can be delivered to the motor (i.e., the power limit is set much higher than a the control transition power $P_{C\text{-}TRANS}$ that corresponds to the control transition torque $T_{C\text{-}TRANS}$). When the amount of torque T on the output shaft exceeds the control transition torque $T_{C\text{-}TRANS}$, the impact mechanism transitions from operating in rotary mode to operating in the impact mode. This generally corresponds to the amount of power P being delivered to the motor exceeding the control transition power $P_{C\text{-}TRANS}$. The power limits $P_1 \ldots P_n$, the time intervals Δt1 . . . Δtn, and the threshold tool parameter values may be stored in a memory in communication with the controller, such as a flash memory, a RAM module, a ROM module, or an external memory module.

Figure 6A:
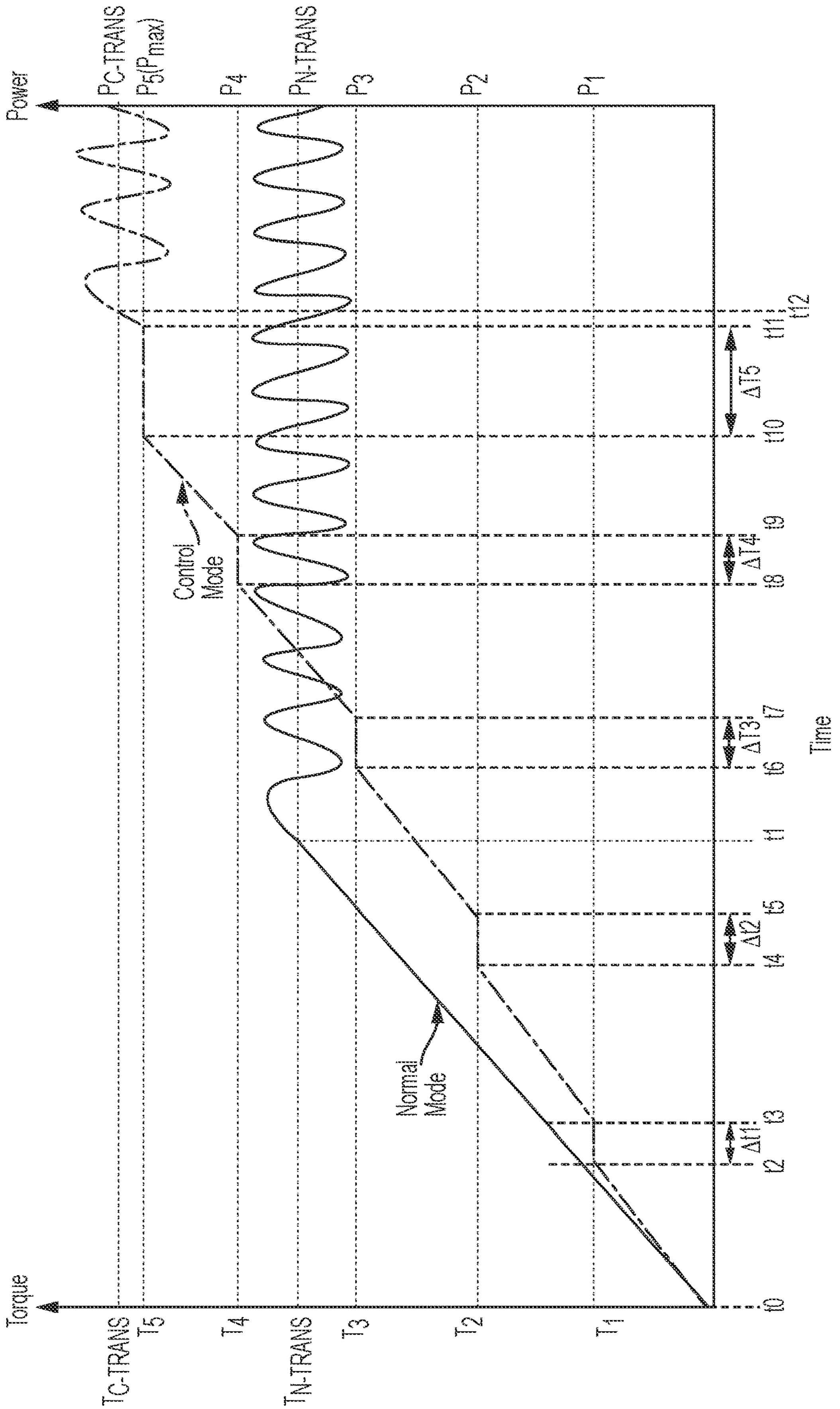
FIG. 6A is a graph showing torque and power over time during operation of the first embodiment of a control mode.

FIG. 6A illustrates the amount of torque T on the output shaft and the amount of power P delivered to the motor over time during operation of the tool in the normal mode and in the first embodiment of the control mode. In the normal mode, at time t0, the trigger is actuated and the impact mechanism 24 operates in the rotary mode. The controller sets no power limit or a very high power limit that is substantially greater than the normal transition power $P_{N\text{-}TRANS}$. From time t0 to time t1, the torque T on the output spindle and the amount of power P delivered to the motor each increase, while the impact mechanism continues to operate in the rotary mode. At time t1, the output torque T reaches the normal transition torque $T_{N\text{-}TRANS}$ for the impact mechanism 24 causing the impact mechanism 24 to transition from operating in the rotary mode to operating in the impact mode. This transition generally corresponds to the power P delivered to the motor reaching the normal transition power $P_{N\text{-}TRANS}$ (although there may be some variance). Starting at time t1, while the impact mechanism 24 is operating in impact mode, the torque T on the output spindle oscillates between zero and a value about the normal transition torque $T_{N\text{-}TRANS}$ (not shown), while the power P delivered to the motor oscillates about the normal transition power $P_{N\text{-}TRANS}$ (e.g., by approximately +/−50%).

In the first embodiment of the control mode, at time t0, the controller sets a first power limit $P_1$ that corresponds to a first torque $T_1$, which are less than the normal transition power $P_{N\text{-}TRANS}$ and the normal transition torque $T_{N\text{-}TRANS}$. From time t0 to time t2, torque and power increase while the impact mechanism operates in the rotary mode. At time t2, the controller senses that a first tool parameter has been reached. For example, the controller may determine that the motor speed, the power, the output torque, the current, the voltage, or the duty cycle has reached a threshold value. From time t2 to time t3, the controller maintains the first power limit $P_1$ for a first predetermined additional time interval Δt1 after the first tool parameter has been reached. Maintaining the first power limit $P_1$ during the additional time interval Δt1 allows additional inertia to be dissipated from the impact mechanism, which will further delay the build-up of inertia that would otherwise cause the impact mechanism to transition to the impact mode of operation.

This process is repeated in steps for additional power limits $P_n$ until n has reached it maximum value (in this case n=5) for a maximum power limit $P_{max}$. At time t3, the controller sets a higher second power limit $P_{C2}$ that corresponds to a higher second torque $T_2$, which are less than the normal transition power $P_{N\text{-}TRANS}$ and the normal transition torque $T_{N\text{-}TRANS}$. The impact mechanism continues to operate in the rotary mode and does not transition to the impact mode. At time t4, the controller senses that a second tool parameter has been reached. The second tool parameter may be the same as or different from the first tool parameter and may have the same or different threshold value. From time t4 to time t5, the controller maintains the second power limit $P_2$ for a predetermined additional time interval Δt2 after the second tool parameter has been reached. Maintaining the second power limit $P_2$ during the additional time interval Δt2 allows additional inertia to be dissipated from the impact mechanism, which will further delay the build-up of inertia that would otherwise cause the impact mechanism to transition to the impact mode of operation.

At time t5, the controller sets the power limit to a higher third power limit $P_3$ that corresponds to a higher third torque $T_3$, which are less than the normal transition power $P_{N\text{-}TRANS}$ and the normal transition torque $T_{N\text{-}TRANS}$. The impact mechanism continues to operate in the rotary mode and does not transition to the impact mode. At time t6, the controller determines that a third tool parameter has been reached. The third tool parameter may be the same as or different from the first and second tool parameters and may have the same or different threshold value. From time t6 to time t7, the controller maintains the third power limit $P_3$ for a predetermined additional time interval Δt3 after the third tool parameter has been reached. Maintaining the third power limit $P_3$ during the additional time interval Δt3 allows additional inertia to be dissipated from the impact mechanism, which will further delay the build-up of inertia that would otherwise cause the impact mechanism to transition to the impact mode of operation.

At time t7, the controller sets the power limit to a higher fourth power limit $P_4$ that corresponds to a higher fourth torque $T_{C4}$, which are higher than the normal transition power $P_{N\text{-}TRANS}$ and the normal transition torque $T_{N\text{-}TRANS}$. However, because of the inertia that has been dissipated from the impact mechanism at the first through third power limits, the impact mechanism continues to operate in the rotary mode, and does not transition to the impact mode. At time t8, the controller determines that a fourth tool parameter has been reached. The fourth tool parameter may be the same as or different from the first, second or third tool parameters and may have the same or different threshold value. From time t8 to time t9, the controller maintains the fourth power limit $P_4$ for a predetermined additional time interval Δt4 after the fourth tool parameter has been reached. Maintaining the fourth power limit $P_4$ during the additional time interval Δt5 allows additional inertia to be dissipated from the impact mechanism, which will further delay the build-up of inertia that would otherwise cause the impact mechanism to transition to the impact mode of operation.

At time t9, the controller sets the power limit to a higher fifth (and maximum) power limit $P_5$ that corresponds to a higher fifth (and maximum) torque $T_5$, which are greater than the normal transition power $P_{N\text{-}TRANS}$ and the normal transition torque $T_{N\text{-}TRANS}$, and which are somewhat lower than the higher control transition power $P_{C\text{-}TRANS}$ and the control transition torque $T_{C\text{-}TRANS}$ However, because of the inertia that has been dissipated from the impact mechanism at the first through fifth power limits, the impact mechanism continues to operate in the rotary mode, and does not transition to the impact mode. At time t10, the controller determines that a fifth tool parameter has been reached. For example, the controller may be coupled to a sensor that senses that the motor speed, the power, the output torque, the current, the voltage, or the duty cycle has reached a threshold value. The fifth tool parameter may be the same as or different from the first, second, third, or fourth tool parameters and may have the same or different threshold value. From time t10 to time t11, the controller maintains the fifth power limit $P_5$ for a predetermined additional time interval Δt5 after the fifth tool parameter has been reached. Maintaining the fifth power limit $P_5$ during the additional time interval Δt5 allows additional inertia to be dissipated from the impact mechanism, which will further delay the build-up of inertia that would otherwise cause the impact mechanism to transition to the impact mode of operation.

At time t11, the controller sets no power limit or a very high power limit that is substantially greater than the control transition power $P_{C\text{-}TRANS}$. At time t12, the output torque T reaches the control transition torque $T_{C\text{-}TRANS}$ for the impact mechanism 24 causing the impact mechanism 24 to transition from operating in the rotary mode to operating in the impact mode. This transition generally corresponds to the power P delivered to the motor reaching the control transition power $P_{C\text{-}TRANS}$ (although there may be some variance). At this time, the impact mechanism transitions from the rotary mode to the impact mode. While the impact mechanism is operating in impact mode after time t11, the output torque on the output shaft oscillates between zero and a value higher than the control transition torque $T_{C\text{-}TRANS}$ (not shown) as the impact mechanism impacts. At the same time, the power delivered to the motor also oscillates about the control transition power $P_{C\text{-}TRANS}$ (e.g., by approximately +/−50%). As is apparent from FIG. 6, the control transition torque $T_{C\text{-}TRANS}$ is substantially higher (e.g., approximately 50% higher) than the normal transition torque $T_{N\text{-}TRANS}$.

In an implementation of the first embodiment, the first through fourth additional time intervals Δt1, Δt2, Δt3, and Δt4 are equal to each other and may be short enough (or even zero) so as to be imperceptible to the user (e.g., approximately 0 to 500 milliseconds). In contrast, the final additional time interval Δt5 is longer than the other additional time intervals Δt1, Δt2, Δt3, Δt4, and is long enough to be perceptible to the user (e.g., approximately 500 milliseconds to 1 second). This longer additional time interval Δt5 is advantageous because it provides the user with time to release the trigger and stop the motor if the user wants to prevent the tool from impacting. In addition, the tool may provide an indication to the user of the final additional time interval Δt5, e.g., by illuminating or flashing a light, by making an audible sound, or by providing tactile feedback, e.g., by causing vibration in the handle of the power tool.

Figure 6B:
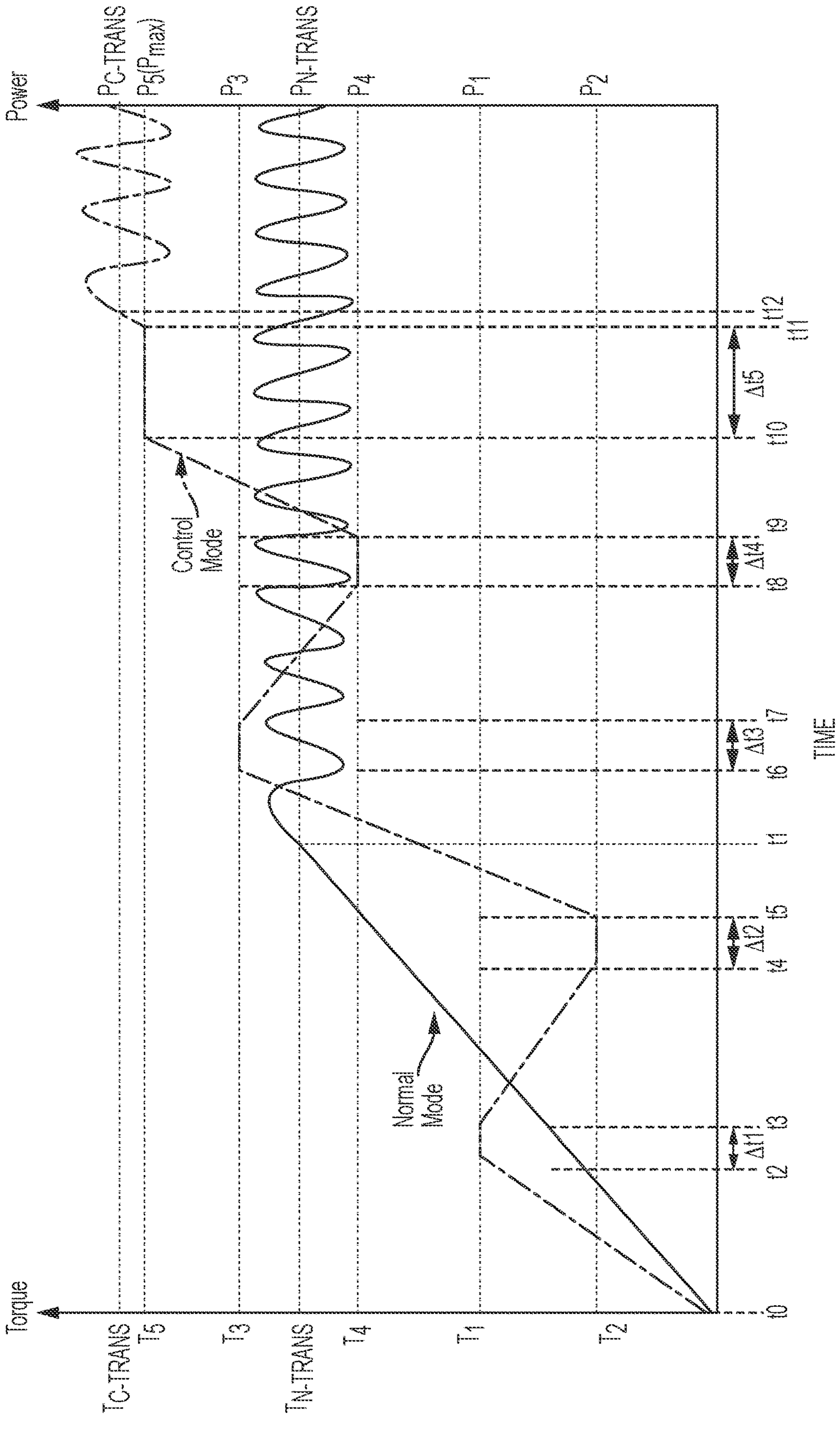
FIG. 6B is a graph showing torque and power over time during operation of a second embodiment of a control mode.

Referring to FIG. 6B, a second embodiment of a control mode may be similar to the first embodiment except that at least one of the first through fifth power limits $P_1$ to $P_5$ do not increase sequentially in a stepwise fashion. Instead, the first through fifth power limits $P_1$ to $P_5$ may comprise a plurality of intermediate power limits (which correspond to a first through firth torque limit $T_1$ to $T_5$) each being less than the control transition power $P_{C\text{-}TRANS}$ (which corresponds to the control transition torque $T_{C\text{-}TRANS}$). For example, as shown in FIG. 6B, $P_2<P_1<P_4<P_3<P_5$. It should be understood that the power limits may vary in other sequences and that one or more of the power limits may be different or the same, so long as all of the power limits are less than the control transition power $P_{C\text{-}TRANS}$.

Figure 6C:
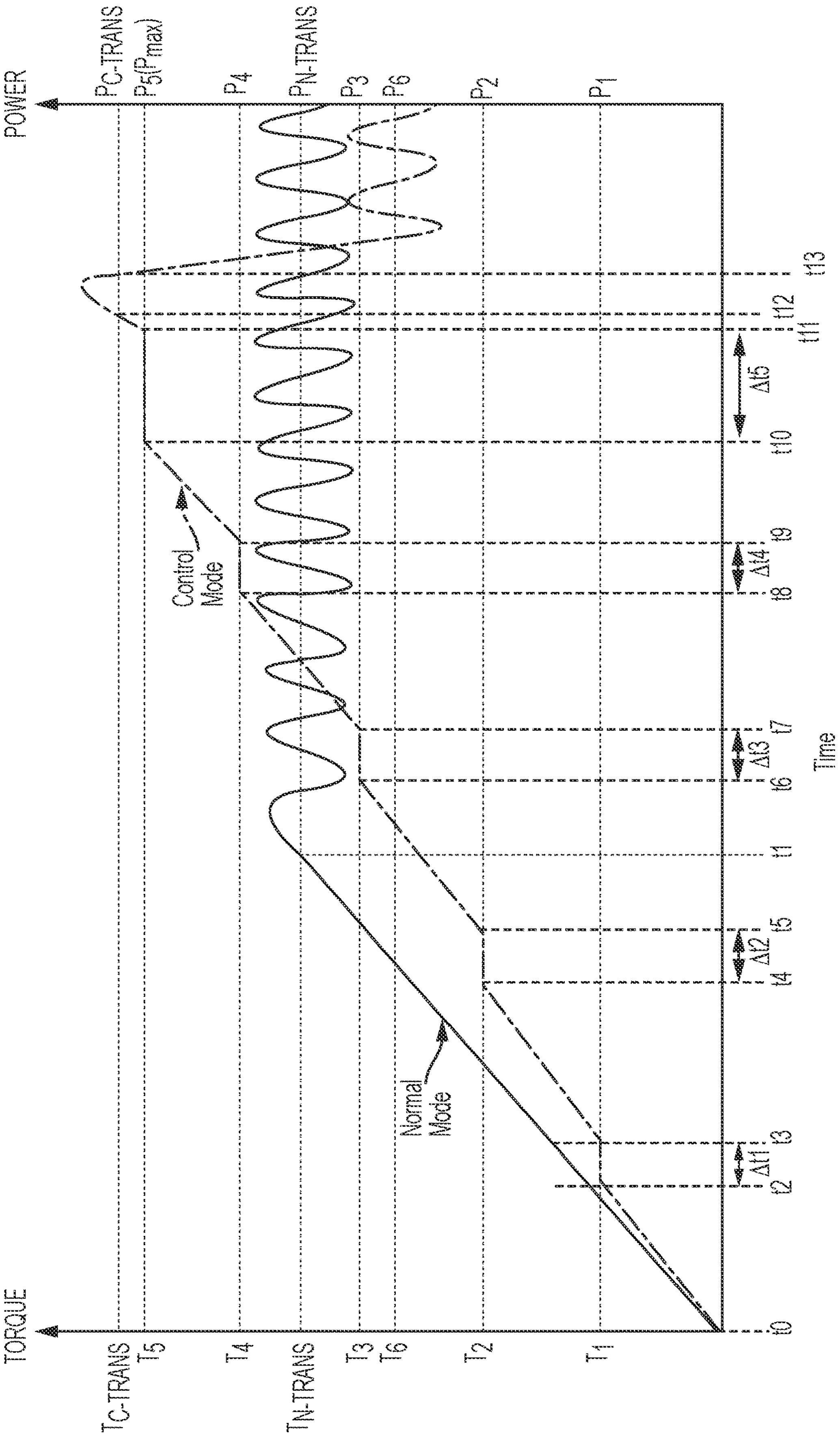
FIG. 6C is a graph showing torque and power over time during operation of a third embodiment of a control mode.

Referring to FIG. 6C, a third embodiment of a control mode may be similar to the first or second embodiments except that at time t13 (shortly after the output torque T reaches the control transition torque $T_{C\text{-}TRANS}$ at time t12, causing the impact mechanism 24 to transition from operating in the rotary mode to operating in the impact mode), the controller sets a sixth power limit $P_6$ that corresponds to a sixth torque level $T_6$, and which are less than the control transition power $P_{C\text{-}TRANS}$ and the control transition torque $T_{C\text{-}TRANS}$. This results in a more controlled impact with a lower maximum output torque during impacting. During impacting, the power delivered to the motor also oscillates about the sixth power limit $P_6$ (e.g., by approximately +/−50%). As shown in FIG. 6C, the sixth power limit $P_6$ is also less than normal transition power $P_{N\text{-}TRANS}$. However, it should be understood that the sixth power limit $P_6$ also may be greater than or equal to the control transition power $P_{N\text{-}TRANS}$.

Figure 7:
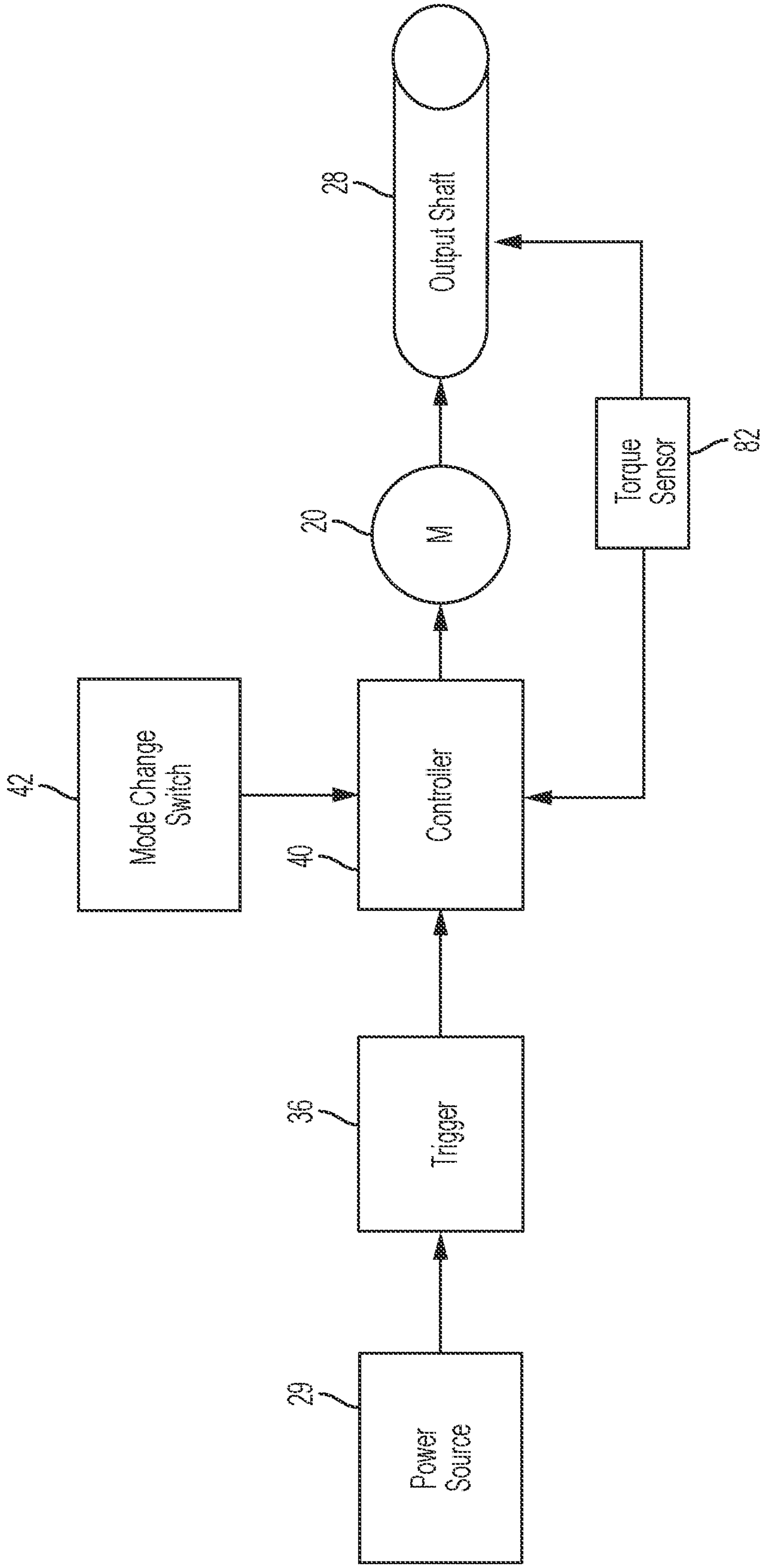
FIG. 7 is a schematic view of a controller configured to implement a fourth embodiment of a control mode.

Referring to FIG. 7, a fourth embodiment of a control mode may be similar to one of the first through third embodiments, except that the controller 40 uses output torque T on the output shaft as the tool parameter for determining when to change the power limit. The controller 40 (e.g., a microprocessor or microcontroller) is coupled to a torque sensor 82 (e.g., a transducer coupled to the output shaft) that senses the amount of torque T on the output shaft. The controller 40 may include a look-up table that correlates a plurality of torque thresholds $T_1 \ldots T_5$ to the power limits $P_1 \ldots P_5$. For a given power limit $P_n$, when a torque threshold $T_n$ is reached, the controller maintains the power limit $P_n$ for the predetermined additional time period Δtn.

Figure 8:
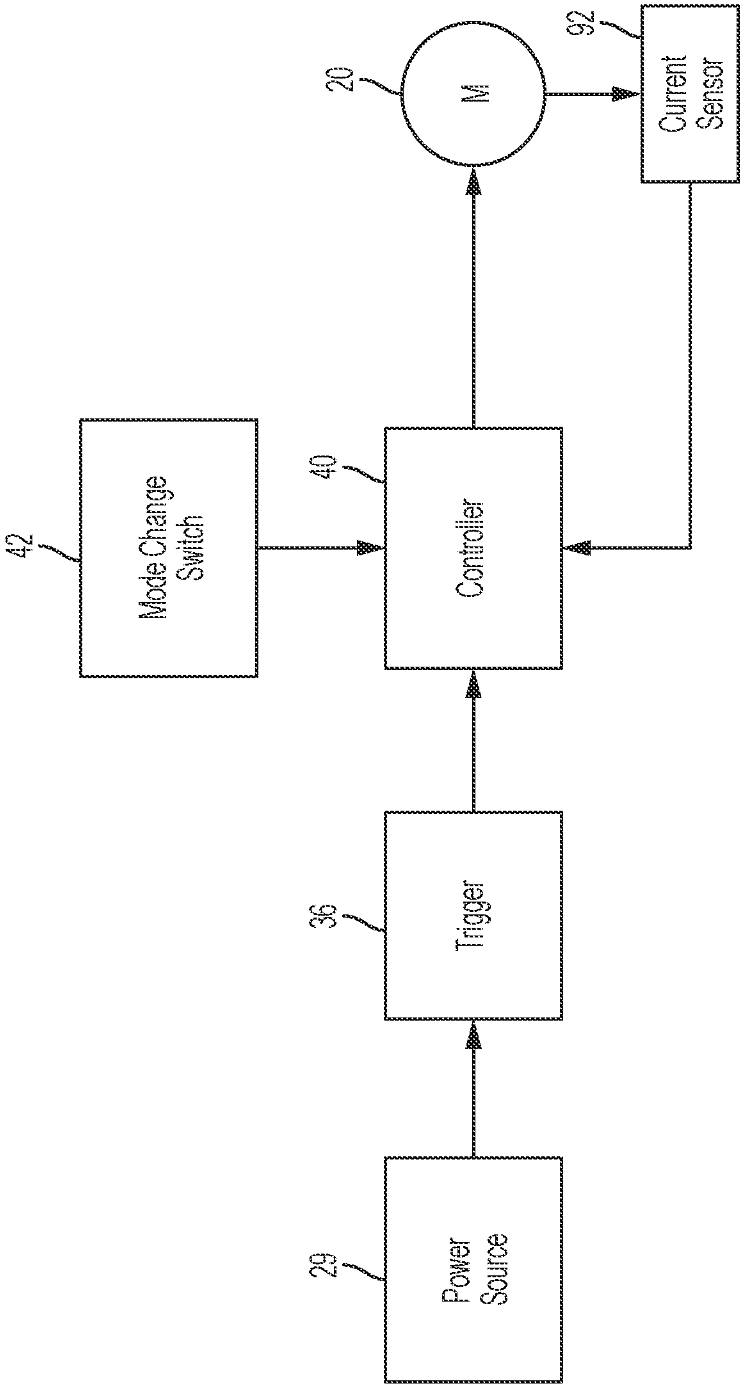
FIG. 8 is a schematic view of a controller configured to implement a fifth embodiment of a control mode.

Referring to FIG. 8, a fifth embodiment of a control mode may be similar to one of the first through third embodiments, except that the controller 40 uses current I delivered to the motor as the tool parameter for determining when to increase the power limit. The controller 40 is coupled to a current sensor 92 (e.g., a shunt resistor) that senses the amount of current I delivered to the motor. The amount of current I is generally proportional to the amount of output torque T. The controller 90 includes a look-up table that correlates a plurality of current thresholds $I_1 \ldots I_5$ to the power limits $P_1 \ldots P_5$. For a given power limit $P_n$, when a current threshold $I_n$ is reached, the controller maintains the power limit $P_n$ for the predetermined additional time period Δtn.

Figure 9:
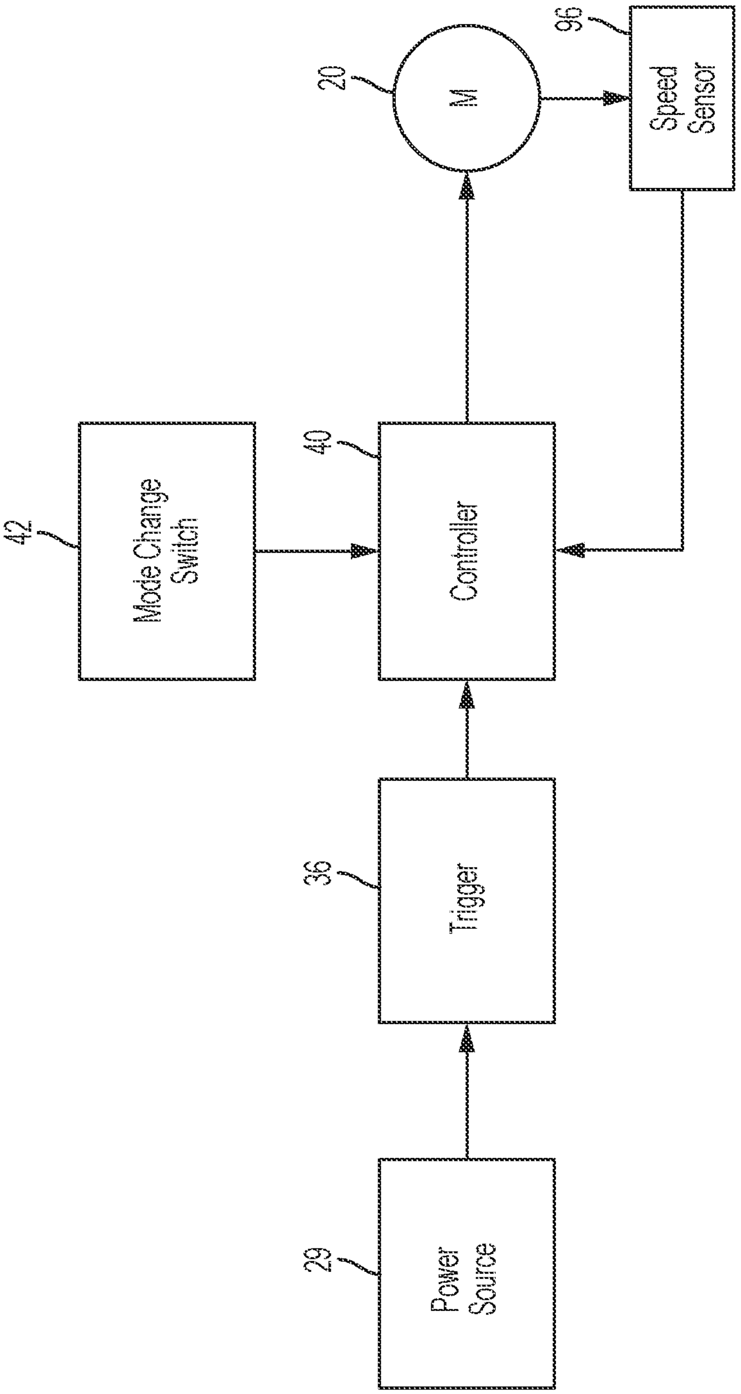
FIG. 9 is a schematic view of a controller configured to implement a sixth embodiment of a control mode.

Referring to FIG. 9, a sixth embodiment of a control mode may be similar to one of the first through third embodiments, except that the controller 40 uses motor speed ω as the tool parameter for determining when to increase the power limit. The controller 40 is coupled to a speed sensor 96 (e.g., a Hall resistor) that senses the motor speed ω. At each power limit $P_n$, the motor speed will initially increase as additional power is applied to the motor, and then will peak and decrease back toward a stall state or zero speed. It has been determined that if the motor is allowed to approach a stall state, the inertia in the impact mechanism will be dissipated. This increases the output transition torque for when the impact mechanism will transition from the rotary mode to the impact mode. Generally, at each power limit $P_n$, the controller 90 determines when the motor speed ω has decreased below than a threshold speed value $\omega_n$, and then continues to maintain the power limit $P_n$ for a predetermined additional time Δtn. The threshold speed values $\omega_n$ for each power limit $P_n$ may be the same or may be different.

Figure 10:
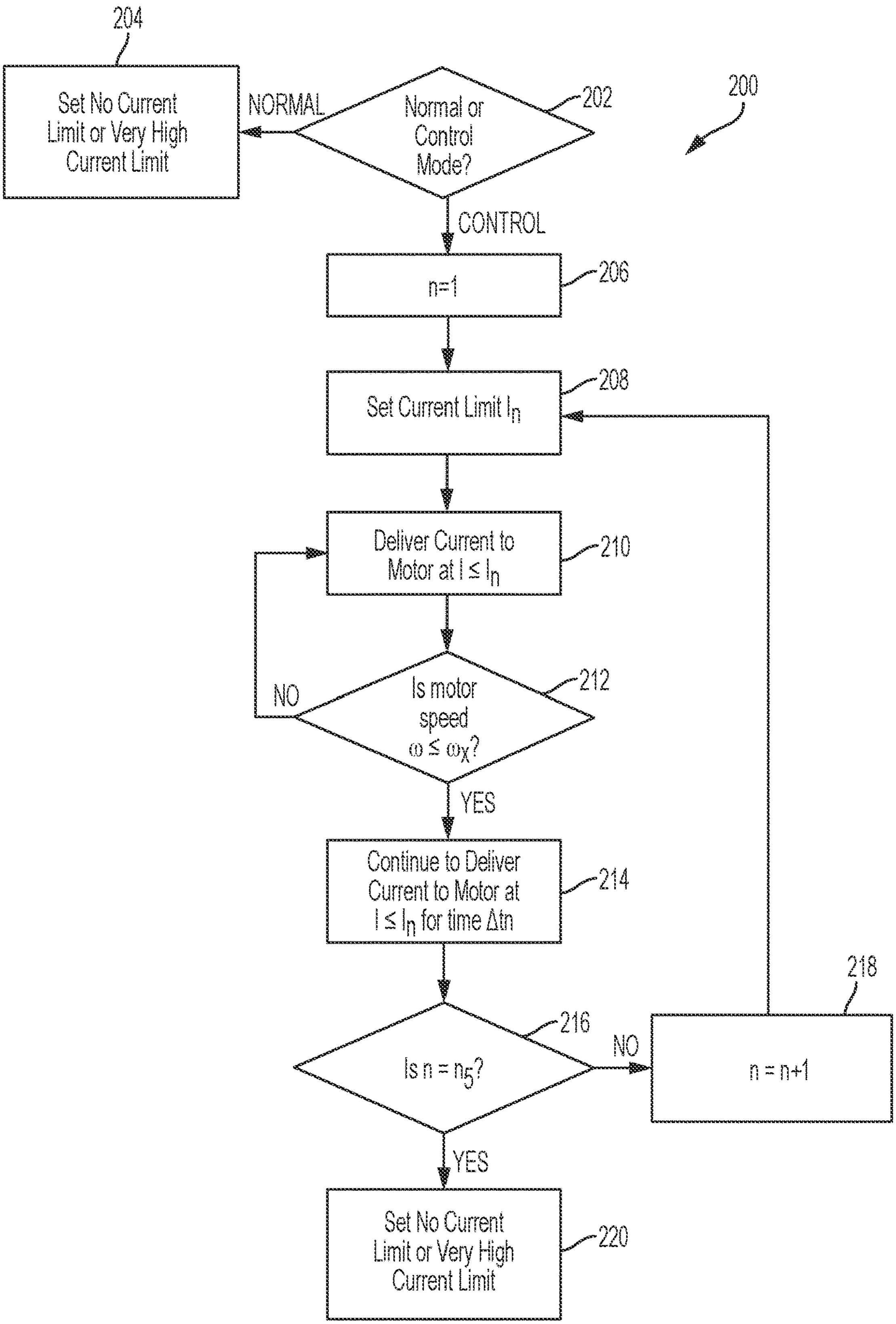
FIG. 10 is a flow chart illustrating operation of the seventh embodiment of the control mode.

Referring to FIG. 10, a seventh embodiment of a control mode may be similar to one of the first through third embodiments except that, the controller 40 is programmed or configured to implement a process 200 for operation of the impact tool 10 using a plurality of current limits $I_n$ instead of power limits $P_n$, and except that the controller 40 uses motor speed ω as the tool parameter for determining when to change the current limits. At step 202, the controller receives an input from the mode change switch 42 as to whether the user has selected the normal mode or the control mode. If the user has selected the normal mode, then at step 104, the controller 40 sets no limit or a very high limit on the amount of current that can be delivered to the motor (i.e., the current limit is set much higher than a normal transition current $I_{N\text{-}TRANS}$ that corresponds to the normal transition torque $T_{N\text{-}TRANS}$). When the amount of torque T on the output shaft exceeds the normal transition torque $T_{N\text{-}TRANS}$, the impact mechanism transitions from operating in rotary mode to operating in the impact mode. This generally corresponds to the amount of current I being delivered to the motor exceeding the normal transition current $I_{N\text{-}TRANS}$.

If, at step 202, the controller 40 determines that the user has selected the control mode, then the controller controls current I delivered to the motor to establish a control transition torque $T_{C\text{-}TRANS}$ that is higher than the normal transition torque $T_{N\text{-}TRANS}$. The control transition torque $T_{C\text{-}TRANS}$ corresponds to a control transition current $I_{C\text{-}TRANS}$ that is higher than the normal transition current $I_{N\text{-}TRANS}$. The higher control transition torque $T_{C\text{-}TRANS}$ can be achieved by initially setting a first current limit $I_1$ for the motor and then increasing the current limit in a plurality of steps $I_n$ until reaching a final maximum current limit Imax that is somewhat less than or equal to the control transition current $I_{C\text{-}TRANS}$. The controller 40 increases the current limit $I_n$ to the next current limit $I_{n+1}$ a predetermined time after the controller 40 determines that the motor speed ω has decreased below a threshold value $\omega_x$. In other words, when the motor speed $\omega_x$ has been reached, the controller 40 maintains the present current limit $I_n$ for a predetermined additional time period Δtn. This allows inertia to be dissipated from the impact mechanism, preventing the impact mechanism from transitioning to the impact mode until the higher control transition torque $T_{C\text{-}TRANS}$ and a higher control transition current $I_{C\text{-}TRANS}$ have been reached. After the maximum current limit Imax of the plurality of current limits has been set and the predetermined additional time for that current limit has expired, the controller 40 sets no current limit or a very high current limit to allow the amount of current delivered to the motor to exceed a control transition current $I_{C\text{-}TRANS}$ so that the impact mechanism transitions from the rotary mode to the impact mode.

More specifically, at step 206, the controller 40 initializes a step counter n to the first step (n=1). At step 208, the controller 40 sets a first current limit $I_1$ that corresponds to a first torque limit $T_1$, each of which are substantially less than the normal transition current $I_{N\text{-}TRANS}$ and the normal transition torque $T_{N\text{-}TRANS}$. The first current limit $I_1$ prevents the motor from delivering enough torque to the impact mechanism to allow the impact mechanism to transition from the rotary mode to the impact mode. At step 210, the controller 40 then delivers power to the motor at a current I that does not exceed the first current limit $I_1$.

At step 212, the controller 40 determines whether the motor speed ω has decreased below a threshold motor speed $\omega_x$. If the motor speed ω has not decreased below the threshold motor speed ox, then the controller 40 returns to step 210 and continues to deliver power to the motor at a current I that does not exceed the first current limit $I_1$. Once the controller 40 determines, at step 212, that the motor speed ω has decreased below a threshold motor speed $\omega_x$, then, at step 214, the controller 40 maintains the first current limit $I_1$ for a predetermined additional time interval Δt1. Maintaining the first current limit $I_1$ during this additional time interval Δt1 allows inertia to be dissipated from the impact mechanism, which delays the build-up of inertia that would otherwise cause the impact mechanism to transition to the impact mode of operation.

After expiration of the additional time Δt1, at step 216, the controller 40 determines whether the counter n has reached its maximum value (in this case n=5). If not, then at step 218, the controller 40 increments the counter n by n+1, and loops back to step 208 to set the next higher current limit (e.g., a second current limit $I_2$) that corresponds to the next higher torque limit (e.g., a second torque limit $T_2$). The above-described process repeats until, at step 216, the controller 40 determines that n has reached its maximum value (e.g., n=5), meaning that the controller 40 has already set the maximum current limit $I_{max}$ (e.g., a fifth current limit $I_5$) that corresponds to a maximum torque limit $T_{max}$ (e.g., a fifth current limit $I_5$). When, at step 216, the controller determines that the counter n has reached its maximum value, then at step 220, the controller 40 sets no limit or a very high limit on the amount of current that can be delivered to the motor (i.e., the current limit is set much higher than a the control transition current IC-TRANS that corresponds to the control transition torque $T_{C\text{-}TRANS}$). When the amount of torque T on the output shaft exceeds the control transition torque $T_{C\text{-}TRANS}$, the impact mechanism transitions from operating in rotary mode to operating in the impact mode. This generally corresponds to the amount of current I being delivered to the motor exceeding the control transition current $I_{C\text{-}TRANS}$.

Figure 11A:
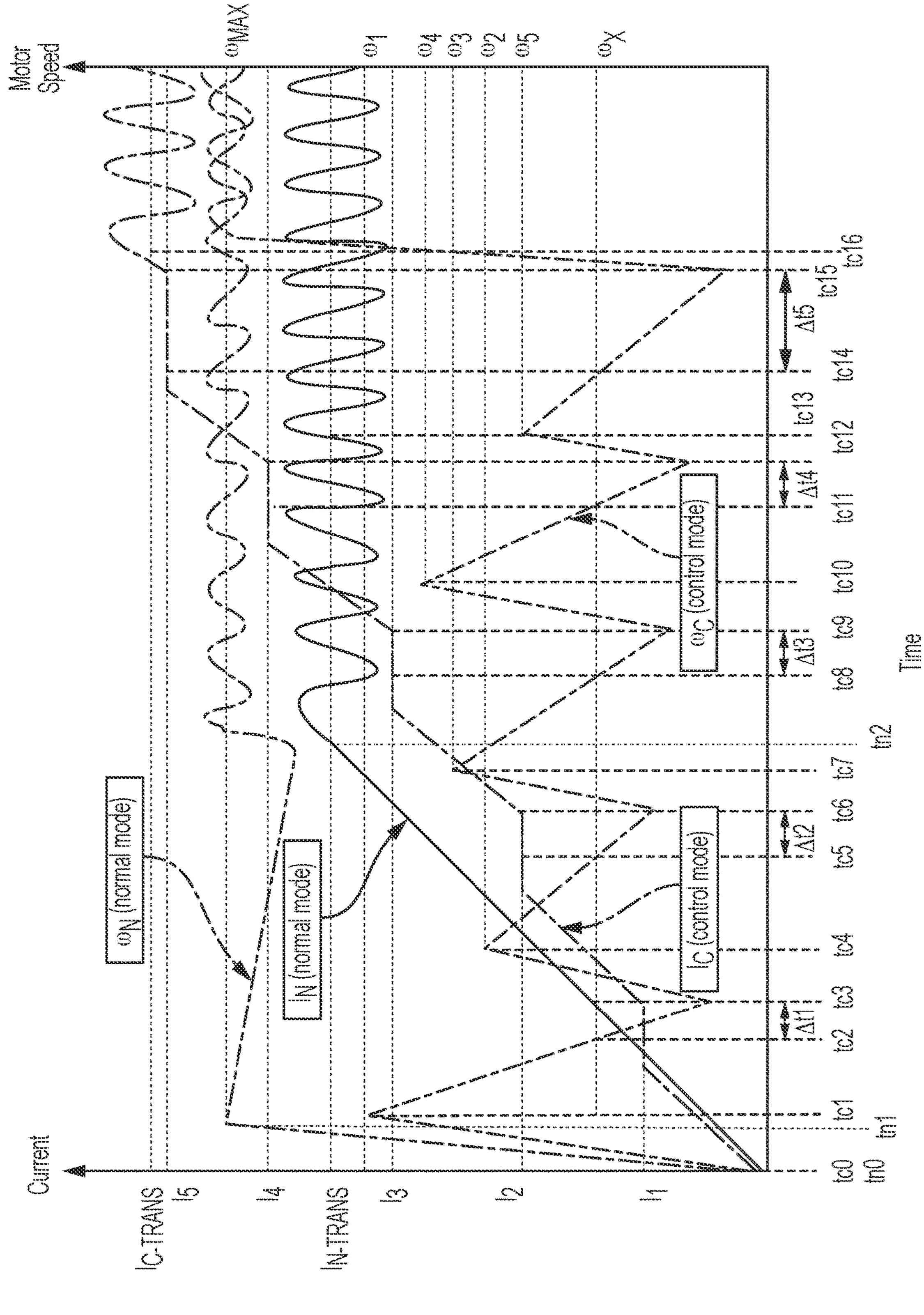
FIG. 11A is a graph showing current and motor speed over time during operation of the seventh embodiment of a control mode.

FIG. 11A illustrates the amount of current I delivered to the motor and the motor speed ω over time during operation of the tool in the seventh embodiment of the normal mode and in a control mode. In the normal mode, at time t0, the controller 40 sets no limit or a very high limit on the amount of current that will be delivered to the motor. When the trigger is actuated, there is little to no load on the output spindle, and the motor speed $\omega_N$ quickly accelerates from zero to a maximum motor speed $\omega_{MAX}$ at time tn1, while the impact mechanism 24 operates in the rotary mode. From time tn1 to time tn2, the torque on the output spindle gradually increases causing the motor speed ω to gradually decrease to a lower speed, while the impact mechanism continues to operate in the rotary mode. Meanwhile, from time t0 to time tn2, the amount of current $I_N$ being delivered to the motor gradually increases from zero to a transition threshold current $I_{N\text{-}TRANS}$. Because current is generally proportional to output torque, this increase in current corresponds to a similar increase in output torque. At time tn2, the output torque T exceeds the normal transition torque $T_{N\text{-}TRANS}$ for the impact mechanism 24, causing the impact mechanism 24 to transition to operating in the impact mode. This transition generally corresponds to the current $I_C$ exceeding a normal transition current $I_{N\text{-}TRANS}$. While the impact mechanism is operating in impact mode, the motor speed $\omega_N$ again rapidly increases to the maximum motor speed $\omega_{MAX}$ and then oscillates about the maximum motor speed $\omega_{MAX}$ (e.g., by approximately +/−28%) as the impact mechanism continues to impact. At the same time, the output torque (not shown) oscillates between zero and a value above the normal transition torque, while the motor current $I_N$ oscillates about the normal transition current $I_{N\text{-}TRANS}$ (by approximately +/−50%).

In the control mode, a higher transition torque $I_{C\text{-}TRANS}$ for when the impact mechanism transitions from the rotary mode to the impact mode can be achieved than the normal transition torque $I_{N\text{-}TRANS}$ that can be achieved in the normal mode. This can be achieved by initially setting a low current limit for the motor and then gradually increasing the current limit in a stepwise fashion each time the motor speed approaches a low speed or stall condition. This allows inertia to be dissipated from the impact mechanism at each step, which prevents the impact mechanism from transitioning from the rotary mode to the impact mode until a higher transition torque than in the normal mode.

At time t0, the controller sets a first current limit $I_{c1}$ on the amount of current $I_C$ that can be delivered to the motor. The first current limit $I_{c1}$ is substantially less than the normal transition current $I_{N\text{-}TRANS}$. The first current limit $I_{c1}$ prevents the motor from delivering enough torque to the impact mechanism to allow the impact mechanism to transition from the rotary mode to the impact mode. When the trigger is actuated at time t0, there is little to no load or torque on the output spindle, and the motor speed $\omega_C$ quickly increases from zero to a first intermediate motor speed $\omega_{C1}$ at time tc1, while the impact mechanism 24 operates in the rotary mode. Because of the lower current limit $I_{c1}$, the first intermediate motor speed $\omega_{C1}$ is less than the maximum motor speed $\omega_{MAX}$ for the motor in the normal mode. After time tc1, the motor speed $\omega_C$ decreases as the torque on the output spindle increases. Because the current $I_C$ delivered to the motor is capped at the first current limit $I_{c1}$, this decrease in motor speed $\omega_C$ in the control mode is more rapid than the decrease in motor speed $\omega_N$ in the normal mode.

At time tc2, the controller senses that the motor speed $\omega_C$ has decreased below a threshold value $\omega_x$. The controller then maintains the first current limit $I_{c1}$ for a predetermined additional time interval Δt1 until time tc3. At time tc3, the motor speed $\omega_C$ has reached a minimum value that may approach a stall condition. Maintaining the first current limit $I_{c1}$ during the additional time interval Δt1 allows inertia to be dissipated from the impact mechanism, which will delay the build-up of inertia that would otherwise cause the impact mechanism to transition to the impact mode of operation.

This process can be repeated stepwise for additional current limits. At time tc3, the controller sets the current limit to a higher second current limit $I_{C2}$, which is still less than the normal transition current $I_{N\text{-}TRANS}$. This allows the motor speed $\omega_C$ to increase to a second intermediate maximum speed $\omega_{C2}$ at time tc4, while the impact mechanism continues to operate in the rotary mode of operation. The second intermediate maximum speed $\omega_{C2}$ is less than the maximum speed $\omega_{MAX}$ for the motor in the normal mode. After time tc4, the motor speed $\omega_C$ rapidly decreases as the torque on the output spindle increases. At time tc5, the controller senses that the motor speed $\omega_C$ has again decreased below the threshold value $\omega_X$. At this time tc5, the controller maintains the second current limit $I_{C2}$ for a predetermined additional time interval Δt2 until time tc6. At time tc6, the motor speed $\omega_C$ has reached a minimum value that again may approach a stall condition. Maintaining the second current limit $I_{C2}$ during the additional time interval Δt allows additional inertia to be dissipated from the impact mechanism, which will further delay the build-up of inertia that would otherwise cause the impact mechanism to transition to the impact mode of operation.

At time tc6, the controller sets the current limit to a higher third current limit $I_{C3}$, which is still less than the normal transition current $I_{N\text{-}TRANS}$. This allows the motor speed $\omega_C$ to increase to a third intermediate maximum speed $\omega_{C3}$ at time tc7, while the impact mechanism continues to operate in the rotary mode of operation. The third intermediate maximum speed $\omega_{C3}$ is less than the maximum speed $\omega_{MAX}$ for the motor in the normal mode. After time tc7, the motor speed $\omega_C$ rapidly decreases as the torque on the output spindle increases. At time tc8, the controller senses that the motor speed $\omega_C$ has again decreased to below the threshold value $\omega_X$. At this time tc8, the controller maintains the third current limit $I_{C3}$ for a predetermined additional time interval Δt3 until time tc9. At time tc9, the motor speed $\omega_C$ has reached a minimum value that again may approach a stall condition. Maintaining the third current limit $I_{C3}$ during the additional time interval Δt allows additional inertia to be dissipated from the impact mechanism, which will further delay the build-up of inertia that would otherwise cause the impact mechanism to transition to the impact mode of operation.

At time tc9, the controller sets the current limit to a higher fourth current limit $I_{C4}$. The fourth current limit $I_{C4}$ is higher than the normal transition current $I_{N\text{-}TRANS}$ at which the impact mechanism transitions to the impact mode in normal operation. However, because of the inertia that was allowed to dissipate from the impact mechanism at the first, second and third current limits, the impact mechanism does not transition to the impact mode. Instead, the motor speed $\omega_C$ increases to a fourth intermediate maximum speed $\omega_{C4}$ at time tc10, while the impact mechanism continues to operate in the rotary mode of operation. The fourth intermediate maximum speed $\omega_{C4}$ is still less than the maximum speed $\omega_{MAX}$ for the motor in the normal mode. After time tc10, the motor speed $\omega_C$ decreases as the torque on the output spindle increases. At time tc11, the controller senses that the motor speed $\omega_C$ has again decreased below the threshold value $\omega_X$. At this time tc11, the controller maintains the fourth current limit $I_{C4}$ for a predetermined additional time interval Δt until time tc12. At time tc12, the motor speed $\omega_C$ has reached a minimum value that again may approach a stall condition. Maintaining the fourth current limit $I_{C4}$ during the additional time interval Δt allows additional inertia to be dissipated from the impact mechanism, which will further delay the build-up of inertia that would otherwise cause the impact mechanism to transition to the impact mode of operation.

At time tc12, the controller again increases the current limit to a higher fifth current limit $I_{C5}$. The fifth current limit $I_{C5}$ is higher than the normal transition current $I_{N\text{-}TRANS}$ at which the impact mechanism transitions to the impact mode in normal operation, and slightly lower than a control transition current $I_{C\text{-}TRANS}$ at which the impact mechanism transitions to the impact mode in the control mode. The motor speed $\omega_C$ increases to a fifth intermediate maximum speed $\omega_{C5}$ at time tc13, while the impact mechanism continues to operate in the rotary mode of operation. The fifth intermediate maximum speed $\omega_{C5}$ is less than the maximum speed $\omega_{MAX}$ for the motor in the normal mode. After time tc13, the motor speed $\omega_C$ decreases as the torque on the output spindle increases. At time tc14, the controller senses that the motor speed $\omega_C$ has again decreased to the low threshold value $\omega_X$. At this time tc14, the controller maintains the fourth current limit $I_{C5}$ for a predetermined additional time interval Δt5 until time tc15. At time tc15, the motor speed $\omega_C$ has reached a minimum value that again may approach a stall condition. Maintaining the fifth current limit $I_{C5}$ during the additional time interval Δt5 allows additional inertia to be dissipated from the impact mechanism, which will further delay the build-up of inertia that would otherwise cause the impact mechanism to transition to the impact mode of operation.

At time tc15, the controller sets no current limit or a very high current limit that is significantly higher that the control transition current $I_{C\text{-}TRANS}$. Shortly thereafter the motor speed $\omega_C$ rapidly increases to the maximum motor speed $\omega_{MAX}$, and, at time tc16, the impact mechanism transitions from the rotary mode to the impact mode. While the impact mechanism is operating in impact mode after time tc16, the motor speed $\omega_C$ oscillates about the maximum motor speed $\omega_{MAX}$ (e.g., by approximately +/−28%) and the motor current $I_C$ oscillates about the control transition current $I_{C\text{-}TRANS}$ (e.g., by approximately +/−50%). As is apparent from FIG. 11, the control transition torque $T_{C\text{-}TRANS}$ is substantially higher (e.g., approximately 50% higher) than the normal transition torque $T_{N\text{-}TRANS}$.

In one implementation of the seventh embodiment, the first through fourth additional time intervals Δtc1, Δtc2, Δtc3, and Δtc4 are equal to each other and short enough so as to be imperceptible to the user (e.g., approximately 0 to 500 milliseconds). In contrast, the final additional time interval Δtc5 is longer than the other time intervals Δtc1, Δtc2, Δtc3, Δtc4, and is long enough so as to be perceptible to the user (e.g., approximately 500 milliseconds to approximately 1 second). This longer additional time interval Δtc5 is advantageous because it provides the user with time to release the trigger and stop the motor if the user wants to prevent the tool from impacting. $I_n$ addition, the tool may provide an indication to the user of the final additional time interval Δtc5, e.g., by illuminating or flashing a light, by making an audible sound, or by providing tactile feedback, e.g., by causing vibration in the handle of the power tool. In another alternative embodiment, the speed thresholds may be different for one or more of the different current limits.

Figure 11B:
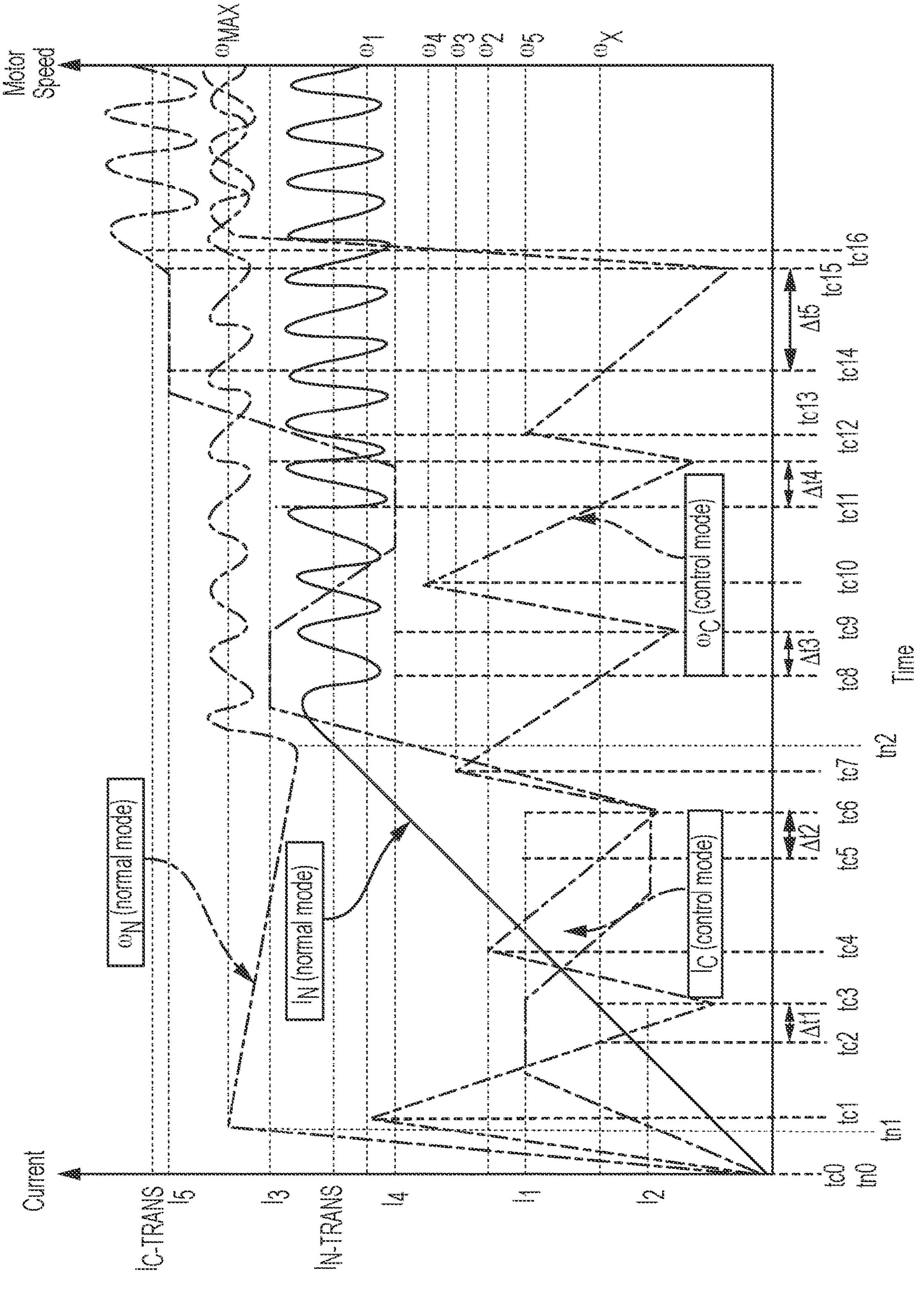
FIG. 11B is a graph showing current and motor speed over time during operation of an eighth embodiment of a control mode.

Referring to FIG. 11B, an eighth embodiment of a control mode may be similar to the seventh embodiment except that at least one of the first through fifth current limits $I_1$ to $I_5$ do not increase sequentially in a stepwise fashion. Instead, the first through fifth current limits $I_1$ to $I_5$ may comprise a plurality of intermediate power limits (which correspond to a first through firth torque limit $T_1$ to $T_5$) each being less than the control transition current $I_{C\text{-}TRANS}$ (which corresponds to the control transition torque $T_{C\text{-}TRANS}$). For example, as shown in FIG. 11B, $I_2<I_1<I_4<I_3<I_5$. It should be understood that the power limits may vary in other sequences and that one or more of the current limits may be different or the same, so long as all of the current limits are less than the control transition current $I_{C\text{-}TRANS}$.

Figure 11C:
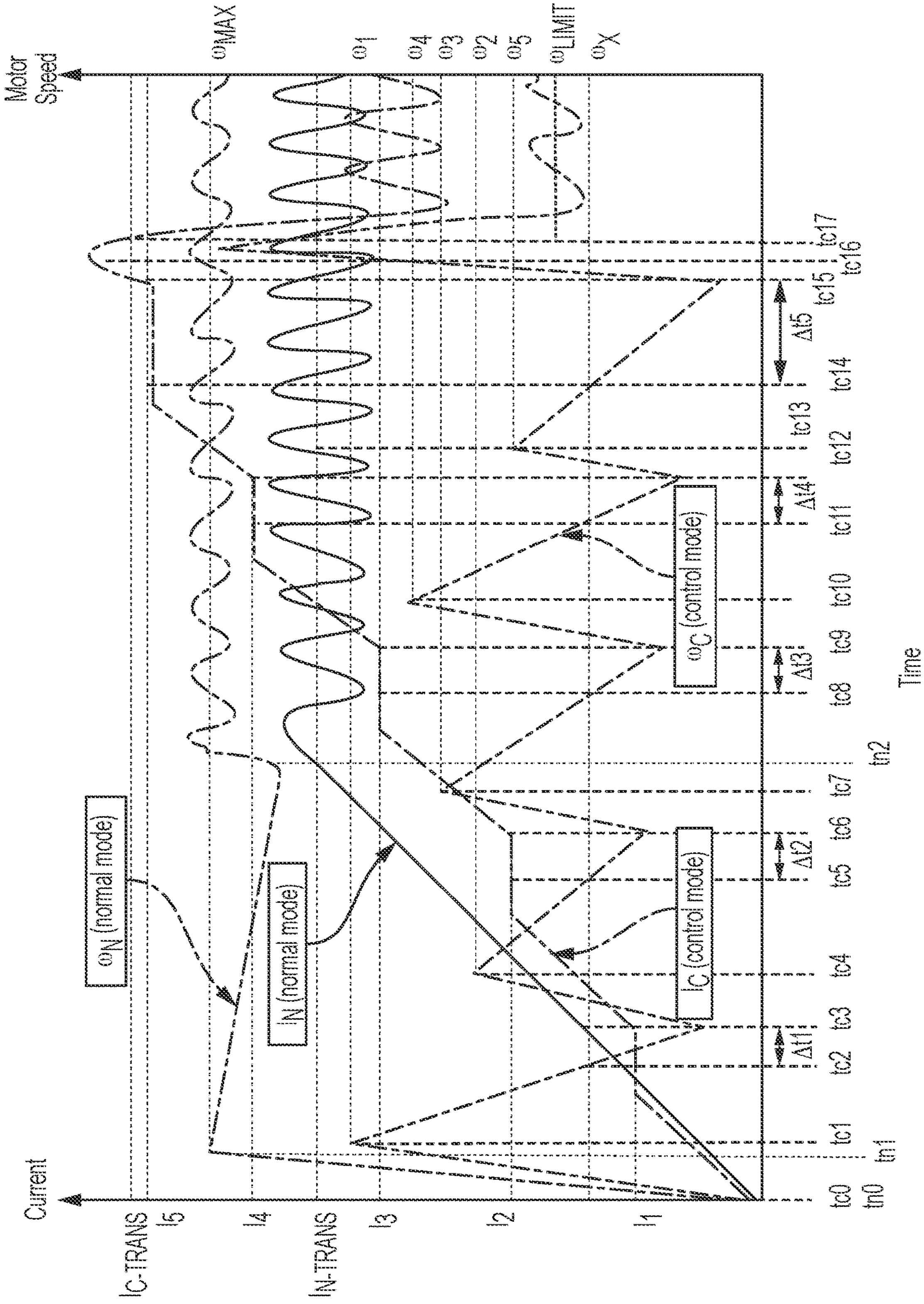
FIG. 11C is a graph showing current and motor speed over time during operation of a ninth embodiment of a control mode.

Referring to FIG. 11C, a ninth embodiment of a control mode may be similar to the seventh or eighth embodiments except that at time tc17 (shortly after the current I reaches the control transition current $I_{C\text{-}TRANS}$ at time tc16, causing the impact mechanism 24 to transition from operating in the rotary mode to operating in the impact mode), the controller sets a speed limit $\omega_{LIMIT}$ for the motor that is lower than the maximum speed ox. The actual motor output speed oscillates about the speed limit $\omega_{LIMIT}$ (e.g., by approximately +/−28%). This in turn causes the current $I_c$ to oscillate about a sixth power value $I_6$ (e.g., by approximately +/−50%), which corresponds to a sixth output torque $T_6$. This results in a more controlled impact with a lower maximum output torque during impacting. As shown in FIG. 11C, the sixth current $I_6$ is less than normal transition current $I_{N\text{-}TRANS}$. However, it should be understood that the sixth current $I_6$ also may be greater than or equal to the normal transition current $I_{N\text{-}TRANS}$. It also should be understood that instead of setting a speed limit $\omega_{LIMIT}$ for the motor at time tc17, the controller could set a lower current limit $I_6$ with a similar effect.

Figure 12:
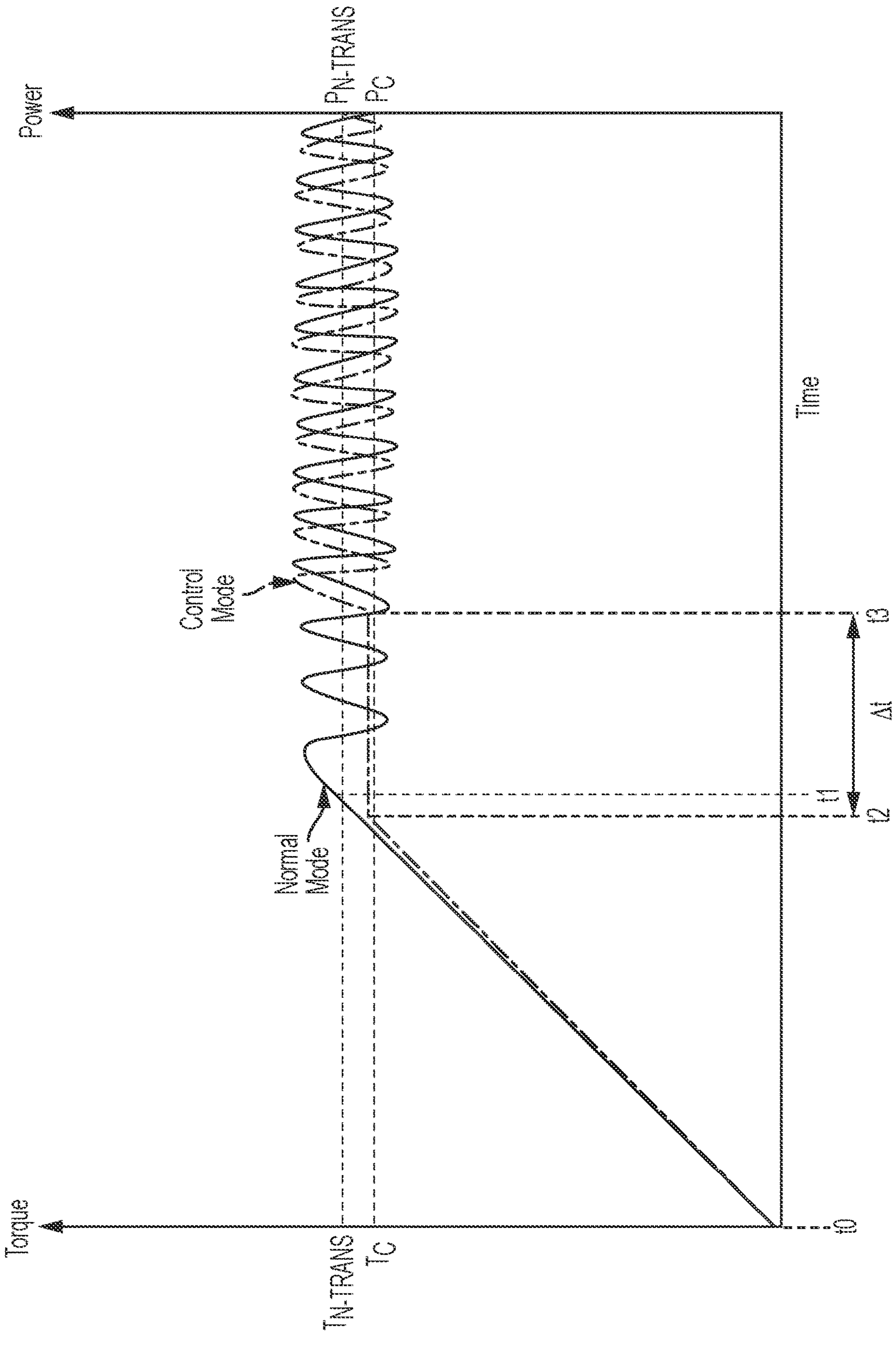
FIG. 12 is a graph showing torque and power over time during operation of a tenth embodiment of a control mode.

Referring to FIG. 12, a tenth embodiment of a control mode may be similar to the first embodiment except that, in the control mode, the controller sets only a single power limit $P_C$ that is slightly lower than the normal transition power $P_{N\text{-}TRANS}$, and that corresponds to a torque limit $T_C$ that is slightly lower than the normal transition torque $T_{N\text{-}TRANS}$. When the power limit $P_C$ is reached at time t2, the controller maintains the power limit $P_C$ for a predetermined additional period of time Δt until time t3. The period of time Δt is long enough to be perceptible to the user (e.g., approximately 500 milliseconds to 1 second) in order to provide the user with time to release the trigger and stop the motor if the user wants to prevent the tool from impacting. In addition, the tool may provide an indication to the user of the additional time interval Δt, e.g., by illuminating or flashing a light, by making an audible sound, or by providing tactile feedback, e.g., by causing vibration in the handle of the power tool.

If the user has not released the trigger by expiration of the time period Δt, then, at time t3, the controller sets no power limit or a very high power limit that is substantially greater than the normal transition power $P_{N\text{-}TRANS}$. Shortly thereafter, the output torque T reaches the normal transition torque $T_{N\text{-}TRANS}$ for the impact mechanism 24 causing the impact mechanism 24 to transition from operating in the rotary mode to operating in the impact mode. This transition generally corresponds to the power P delivered to the motor reaching the normal transition power $P_{N\text{-}TRANS}$ (although there may be some variance). At this time, the impact mechanism transitions from the rotary mode to the impact mode. While the impact mechanism is operating in impact mode after time t3, the output torque on the output shaft oscillates between zero and a value higher than the normal transition torque $T_{N\text{-}TRANS}$ (not shown) as the impact mechanism impacts. At the same time, the power delivered to the motor also oscillates about the normal transition power $P_{N\text{-}TRANS}$ (e.g., by approximately +/−50%).

It should be noted that the power limit $P_C$ is set close enough to the normal transition power that very little, if any inertia, is dissipated during the time period Δt. Rather, the purpose of the additional time period Δt is to give the user time to release the trigger to avoid impacting. Also, it should be understood that, instead of setting a power limit, the controller could set a limit for a different tool parameter, such as current, motor speed, voltage, or duty cycle.

Figure 13:
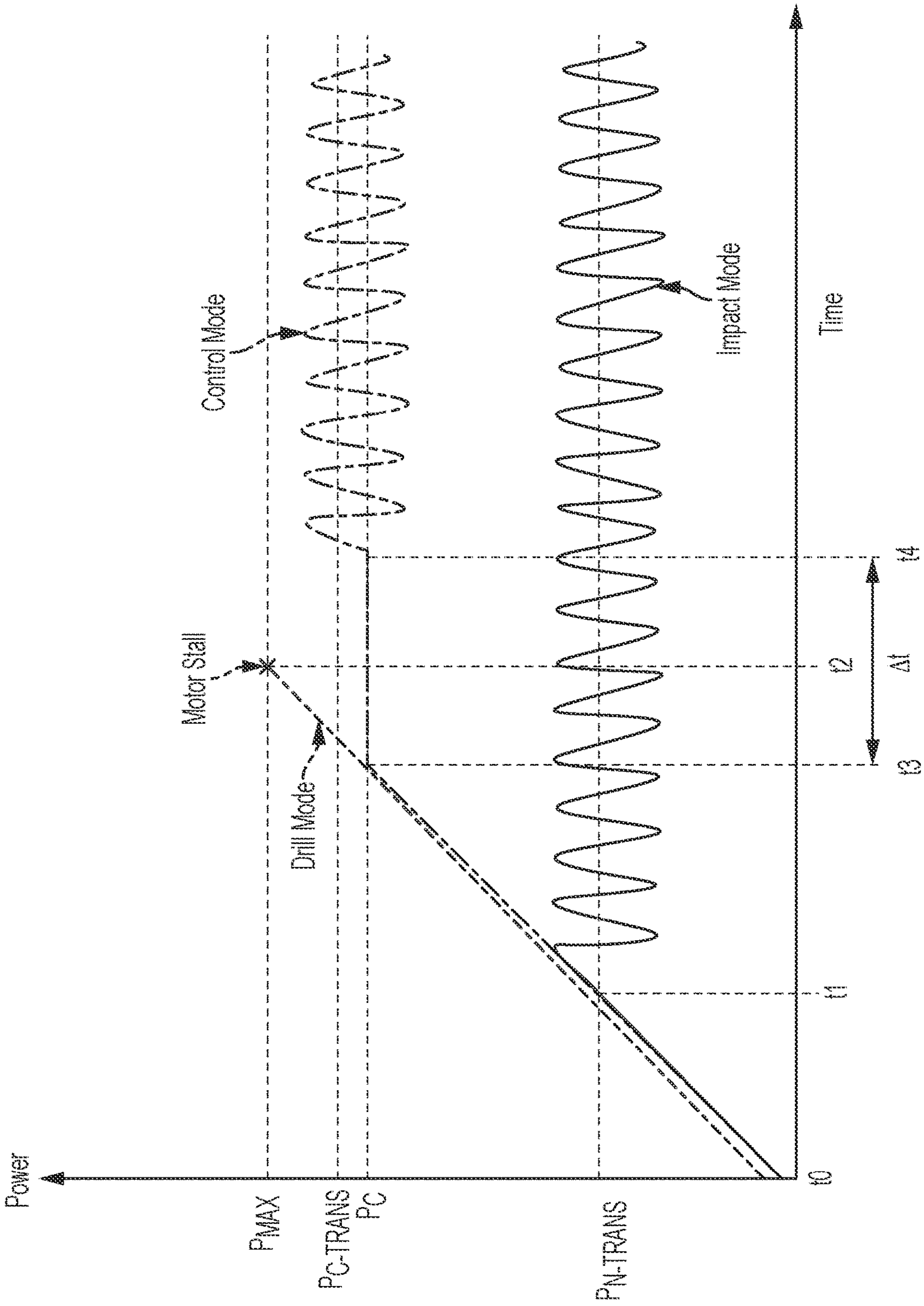
FIG. 13 is a graph showing power over time during operation of an eleventh embodiment of a control mode.

Referring to FIG. 13, in an eleventh embodiment, a control mode may be implemented in conjunction with a hybrid impact tool, such as those described in U.S. Pat. Nos. 7,806,198 and 8,794,348, which are hereby incorporated by reference in their entirety. For example, U.S. Pat. No. 8,794,348 describes several embodiments of a hybrid impact tool that has a mode change mechanism that be switched to enable the transmission to operate in one of a drill mode in which the mode change mechanism does not allow rotary impacting by the impact mechanism and an impact mode in which the mode change mechanism allows for impacting by the impact mechanism. U.S. Pat. No. 8,794,348 further discloses that the mode change mechanism can be changed manually by a user to the desired mode, or can change automatically via a controller and an electromechanical actuator, when the controller determines that a certain tool parameter, such as torque or current to the motor, has reached a threshold value.

According to the embodiment of FIG. 13, the hybrid impact tool of U.S. Pat. No. 8,794,348 may be modified to allow for operation in a control mode with a delay for impacting. The hybrid impact tool of the aforementioned application has an impact mechanism that can operate in one of a rotary configuration in which the impact mechanism transmits rotational motion to the output spindle without rotational impacts, and an impacting configuration in which the impact mechanism transmits rotational impacts to the output spindle. The tool of the aforementioned application is operable in an impact mode and in a drill mode. In the impact mode, the impact mechanism operates as in a normal impact driver and is configured to transition from the rotary configuration to the impacting configuration when an output torque exceeds a first threshold value. In the drill mode, the impact mechanism is mechanically prevented from transitioning from the rotary configuration to the impacting configuration, regardless of the output torque. In certain embodiments, a controller may be coupled to an electromechanical actuator to select between the impact mode and the drill mode.

The embodiment of FIG. 13 adds an additional control mode that prevents the impact mechanism from transitioning from the rotary configuration to the impacting configuration until the output torque exceeds a second, higher threshold value. As shown in FIG. 13, in the impact mode, the impact mechanism will transition to providing rotary impacts at a time t1 when a normal transition torque $T_{N\text{-}TRANS}$, which corresponds to a normal transition power $P_{N\text{-}TRANS}$, is reached. This transition point is determined by the mechanical characteristics of the impact mechanism as described above. In the drilling mode, the impact mechanism is mechanically prevented from transitioning to providing rotary impacts. Instead, the output torque and the power applied to the motor will continue to increase until they reach maximum values $T_{MAX}$ and $P_{MAX}$ at a time t2, at which time the motor will stall.

In the control mode, the controller will initially cause the impact mechanism to operate in the drill mode by mechanically preventing the impact mechanism from transitioning to the impacting configuration. The controller also sets a power limit $P_C$ that corresponds to a torque limit $T_C$, which are less than the maximum torque $T_{MAX}$ and the maximum power $P_{MAX}$ at which the motor will stall. When the power reaches the power limit $P_C$ at time t3, the controller maintains that power for an additional time period Δt until a time t3. This additional time period may be sufficiently long to be perceptible to the user (e.g., approximately 500 ms to 1 second) to give the user time to release the trigger before transitioning to the impacting configuration. In addition, the tool may provide an indication to the user of the additional time interval Δt, e.g., by illuminating or flashing a light, by making an audible sound, or by providing tactile feedback, e.g., by causing vibration in the handle of the power tool. At time t3, if the user has not released the trigger, the controller actuates the electromechanical actuator to cause the impact mechanism to switch from operation in the drill mode to operation in the impact mode. Shortly thereafter, the power reaches a control transition power $P_{C\text{-}TRANS}$, which corresponds to a control transition torque $T_{C\text{-}TRANS}$. At this point, the impact mechanism transitions from the rotary configuration to the impacting configuration, and delivers rotary impacts to the output shaft. The control transition power $P_{C\text{-}TRANS}$ and control transition torque $T_{C\text{-}TRANS}$ are greater than the normal transition power $P_{N\text{-}TRANS}$ and normal transition torque $T_{C\text{-}TRANS}$, thus delaying impacting until a higher output torque is reached.

Numerous other modifications may be made to the exemplary embodiments described above. For example, the tool parameter may be the voltage delivered to the motor or the duty cycle of a pulse-width-modulation signal delivered to the motor. The additional time intervals for each power limit or current limit each may be different from one another. These and other implementations are within the scope of the following claims.

What is claimed is:

1. An impact tool comprising:

a housing;

a motor disposed in the housing;

an output spindle;

an impact mechanism coupled to the output spindle and configured to be driven by the motor, the impact mechanism configured to transmit continuous rotary motion without impacts from the motor to the output spindle when a torque on the output spindle does not exceed a first transition torque, and to transmit rotational impacts from the motor to the output spindle when a torque on the output spindle exceeds the first transition torque while the motor rotates in a single direction; and a controller electrically coupled to the motor to control operation of the motor by controlling a first parameter, the first parameter being at least one of power, current, voltage, resistance, duty cycle of a PWM signal, or motor speed, wherein the controller is configured to determine if a second parameter has reached a first threshold value, the second parameter being at least one of an amount of current being delivered to the motor, an amount of power being delivered to the motor, a speed of the motor, or a torque on the output spindle, and wherein, when the controller determines that the second parameter has reached the first threshold value, the controller temporarily holds the second parameter at or below the first threshold value for a first predetermined time period by controlling the first parameter, and then allows the second parameter to increase beyond the first threshold value, so that the impact mechanism transitions from transmitting continuous rotary motion to transmitting rotational impacts when the torque on the output spindle exceeds a second transition torque that is greater than the first transition torque.

2. The impact tool of claim 1, wherein, during the first predetermined time period, the controller temporarily limits an amount of power delivered to the motor to not exceed a first power limit.

3. The impact tool of claim 2, wherein, during the first predetermined time period, the controller temporarily limits the amount of power delivered to the motor by controlling at least one of current, voltage, resistance, duty cycle of the PWM signal, or motor speed.

4. The impact tool of claim 2, wherein, after the first predetermined time period, the controller allows the amount of power delivered to the motor to exceed the first power limit.

5. The impact tool of claim 1, wherein the first predetermined time period is at least 500 ms to allow a user time to stop application of power to the motor.

6. The impact tool of claim 1, wherein the first threshold value corresponds to a first output torque that is less than the first transition torque.

7. The impact tool of claim 1, wherein, after the controller allows the second parameter to increase beyond the first threshold value, the controller is configured to determine if the second parameter has reached a second threshold value that is different from the first threshold value, and, when the controller determines that the second parameter has reached the second threshold value, the controller temporarily holds the second parameter at or below the second threshold value for a second predetermined time period by controlling the first parameter, and then allows the second parameter to increase beyond the second threshold value.

8. The impact tool of claim 7, wherein the second threshold value is higher than the first threshold value.

9. The impact tool of claim 7, wherein the first threshold value corresponds to a first output torque that is less than the first transition torque, and the second threshold value corresponds to a second output torque that is greater than the first transition torque.

10. The impact tool of claim 1, wherein, after the impact mechanism transitions to transmitting rotational impacts when the torque on the output spindle exceeds the second transition torque, the controller controls the first parameter to reduce the second parameter to a lower value.

11. An impact tool comprising:

a housing;

a motor disposed in the housing;

an output spindle;

an impact mechanism coupled to the output spindle and configured to be driven by the motor, the impact mechanism configured to transmit continuous rotary motion without impacts from the motor to the output spindle when a torque on the output spindle does not exceed a first transition torque, and to transmit rotational impacts from the motor to the output spindle when a torque on the output spindle exceeds the first transition torque while the motor rotates in a single direction; and a controller electrically coupled to the motor to control operation of the motor by controlling a first parameter, the controller selectively operable in a normal mode and a control mode, wherein, in the normal mode, the controller controls the first parameter so that the impact mechanism transitions from transmitting continuous rotary motion to transmitting rotational impacts when the transition torque reaches the first threshold torque, and wherein, in the control mode, the controller is configured to determine if a second parameter has reached a first threshold value, then temporarily hold the second parameter at or below the first threshold value for a first predetermined time period by controlling the first parameter, and then allow the second parameter to increase beyond the first threshold value so that the impact mechanism transitions from transmitting continuous rotary motion to transmitting rotational impacts when the torque on the output spindle exceeds a second transition torque that is greater than the first transition torque, wherein the first parameter is at least one of power, current, voltage, resistance, duty cycle of a PWM signal, or motor speed, and the second parameter is at least one of an amount of current being delivered to the motor, an amount of power being delivered to the motor, a speed of the motor, or a torque on the output spindle.

12. The impact tool of claim 11, wherein, in the control mode, during the first predetermined time period, the controller temporarily limits an amount of power delivered to the motor to not exceed a first power limit.

13. The impact tool of claim 12, wherein, in the control mode, during the first predetermined time period, the controller temporarily limits the amount of power delivered to the motor by controlling at least one of current, voltage, resistance, duty cycle of the PWM signal, or motor speed.

14. The impact tool of claim 12, wherein, in the control mode, after the first predetermined time period, the controller allows the amount of power delivered to the motor to exceed the first power limit.

15. The impact tool of claim 11, wherein, in the control mode, the first predetermined time period is at least 500 ms to allow a user time to stop application of power to the motor.

16. The impact tool of claim 11, wherein, in the control mode, the first threshold value corresponds to a first output torque that is less than the first transition torque.

17. The impact tool of claim 11, wherein, in the control mode, after the controller allows the second parameter to increase beyond the first threshold value, the controller is configured to determine if the second parameter has reached a second threshold value that is different from the first threshold value, and, when the controller determines that the second parameter has reached the second threshold value, the controller temporarily holds the second parameter at or below the second threshold value for a second predetermined time period by controlling the first parameter, and then allows the second parameter to increase beyond the second threshold value.

18. The impact tool of claim 17, wherein, in the control mode, the second threshold value is higher than the first threshold value.

19. The impact tool of claim 18, wherein, in the control mode, the first threshold value corresponds to a first output torque that is less than the first transition torque, and the second threshold value corresponds to a second output torque that is greater than the first transition torque.

20. The impact tool of claim 11, wherein, in the control mode, after the impact mechanism transitions to transmitting rotational impacts when the torque on the output spindle exceeds the second transition torque, the controller controls the first parameter to reduce the second parameter to a lower value.

* * * * *